(12) United States Patent
Furman

(10) Patent No.: US 8,147,345 B2
(45) Date of Patent: Apr. 3, 2012

(54) BABY SEAT SLING FOR SUSPENDING A BABY SEAT FROM A STRUCTURE

(76) Inventor: Mark Furman, Barrington, IL (US)

( * ) Notice: Subject to any disclaimer, the term of this patent is extended or adjusted under 35 U.S.C. 154(b) by 152 days.

(21) Appl. No.: 12/785,029

(22) Filed: May 21, 2010

(65) Prior Publication Data

US 2011/0012394 A1    Jan. 20, 2011

Related U.S. Application Data

(63) Continuation-in-part of application No. 12/384,564, filed on Apr. 7, 2009, now abandoned.

(60) Provisional application No. 61/116,006, filed on Nov. 19, 2008.

(51) Int. Cl.
*A63G 9/12* (2006.01)
*A63G 9/00* (2006.01)

(52) U.S. Cl. ........................................ 472/118; 297/273

(58) Field of Classification Search .......... 472/118–125, 472/133; 297/273, 274; 482/69
See application file for complete search history.

(56) References Cited

U.S. PATENT DOCUMENTS

| | | | | | |
|---|---|---|---|---|---|
| 1,057,360 | A | * | 3/1913 | Patten | 297/274 |
| 2,655,198 | A | * | 10/1953 | Williams et al. | 297/274 |
| 4,861,021 | A | * | 8/1989 | Edwards et al. | 482/69 |
| 5,729,844 | A | * | 3/1998 | Kerstetter | 5/104 |
| 6,135,929 | A | * | 10/2000 | Warner | 482/69 |
| 6,648,411 | B2 | * | 11/2003 | Julien | 297/274 |

* cited by examiner

Primary Examiner — Kien Nguyen

(57) ABSTRACT

A baby seat sling suspends a baby seat from a structure. A lower strap harness extends around the rear surface of the baby seat. A lower strap suspension point extends above the seating surface of the baby seat. The lower strap suspension point comprises a junction of ends of the lower strap harness. An upper strap suspension strap is attached to the lower strap suspension point and to the structure located above the baby seat.

22 Claims, 23 Drawing Sheets

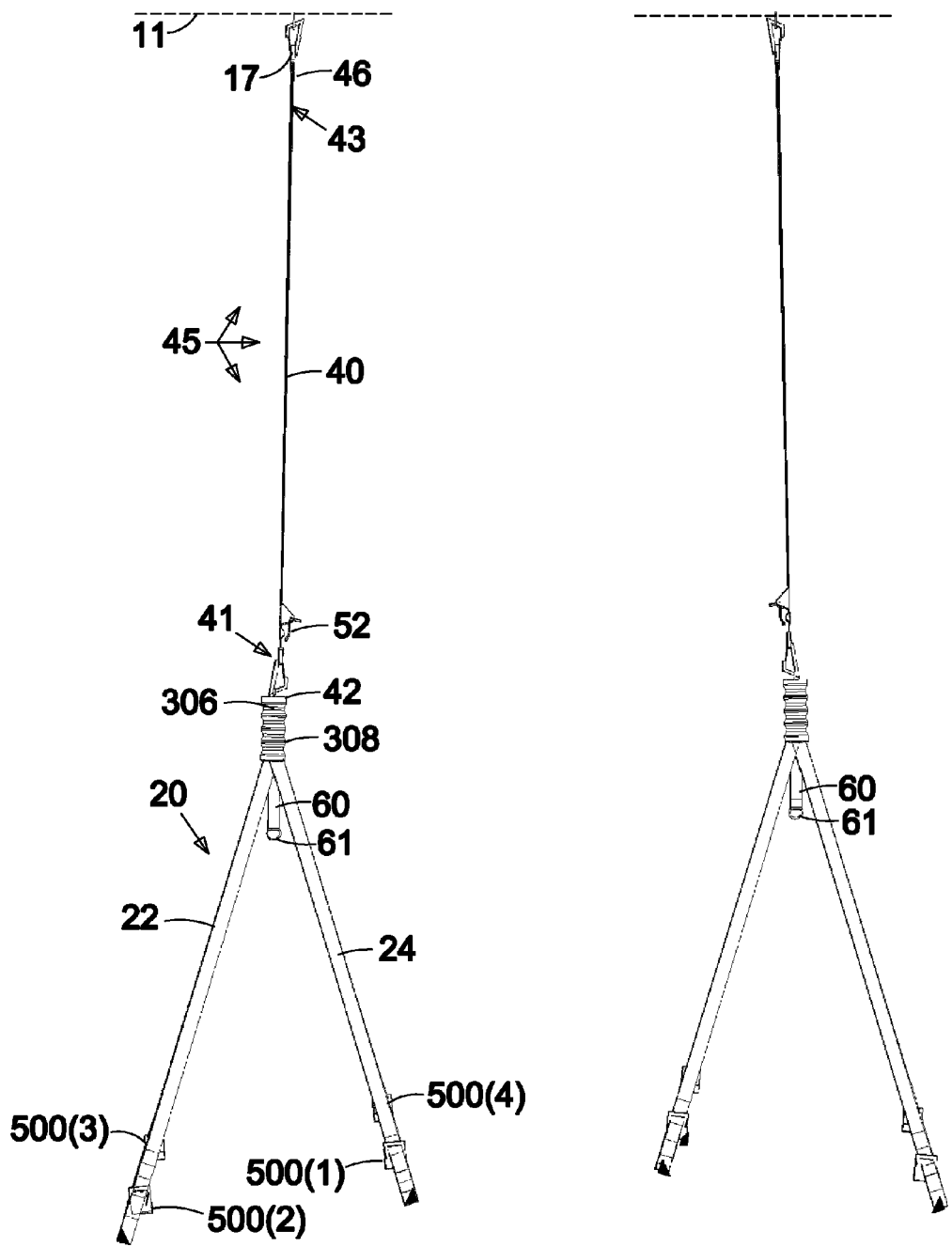
FIG. 9  FIG. 10

BABY SEAT SLING FOR SUSPENDING A BABY SEAT FROM A STRUCTURE

This application is a continuation-in-part of U.S. patent application Ser. No. 12/384,564 filed Apr. 7, 2009 now abandoned, which claims the benefit of U.S. Provisional Application No. 61/116,006 filed Nov. 19, 2008, both of which are hereby incorporated by reference.

BACKGROUND

Baby seats are used to support and secure a baby or small child to a seat so the baby can be safely transported in a vehicle, a stroller, carried by hand, and the like. Baby seats for these and other uses are well known and are commercially available in nearly endless designs having a huge array of configurations and options.

All baby seats for these and other uses have a rigid portion. The rigid portion has a head end where the baby's head is most closely positioned, a foot end where the baby's feet are most closely positioned, a right side, and a left side.

The rigid portion comprises a rigid shell that is contoured throughout. The rigid shell has a contoured front surface for supporting the child. Oftentimes padding is added to cover the front surface and provide a more comfortable seating area for the child. A seat belt or harness attached to the rigid shell secures the child to the front surface.

Opposite the front surface is a contoured rear surface. The rear surface is usually contoured to dock or mate with a base. Examples of a base include a car-seat base connected to the seat of a vehicle by a seat belt or connected to a stroller frame (where the baby seat is removable and the stroller frame is the base). The rear surface may be contoured with flat or supporting contours so that it is stable when placed on the ground. The front surface may also be contoured to dock or mate with a base. Other contours on the front or rear surfaces include ridges, lips, grooves, indentations, protrusions, openings, and the like. Contours such as openings may serve the function of allowing a seat belt or harness to pass through, or may be there to reduce the weight of the baby seat, or may be the result of a manufacturing requirement. Some of the contours may have a function, for example to mate with a corresponding base, and some may serve no function, at least to an end-user, such as a ridge that is the result of or required by a manufacturing process.

The rigid portion also includes rigid extensions extending from the rigid shell. One common example of a rigid extension is a carrying handle. The carrying handle, which is part of the rigid portion, is connected to the rigid shell. It is appreciated that the connection may be a moveable connection, such as a handle moveably connected so that it can pivot. It is also appreciated that the rigid shell may comprise more than one rigid section and that the rigid sections may by moveably connected to one another, such as in a baby seat wherein the angle between the head end and the foot end is adjustable. This allows the baby seat to be changed from a generally upright seating position to a generally flat lying down position. Accessories may also be attached to the rigid shell, such as umbrellas, cups, and the like.

It should be clear now that the rigid portion of the baby seat can have an infinite number of arrangements and contours and that the topography of the rigid portion depend on things such as the intended use of the baby seat, manufacturing requirements, safety regulations, and the like. Accordingly, each baby seat has a topography defined at least in part by the contours that are specific to each manufacturer, and such topographies even vary among different product lines from the same manufacturer.

The designs are limitless, and a study of the multitude of baby carriers currently on the market confirms that, inasmuch as the rigid portion is concerned, almost every design is different from every other design. As a result, in general, a baby carrier designed to be used with one base or accessory cannot be used with a different base or accessory.

As mentioned above, uses of a baby seat include securely carrying a baby or setting the baby down without worrying that the baby will crawl away or get injured. For this, the baby seat may have a handle and a generally flat rear surface topography, It would be desirable if there were also a way to suspend any baby seat from a structure. For example it would be desirable to be able to hang the baby seat from a frame on the floor, or from a bar secured in a doorway, or from a tree limb, or from a hook on a ceiling, thereby converting the baby seat into a swing. In another example the structure that the baby seat is suspended from is the shoulder of a person. In such an arrangement the person can carry the baby in the baby seat in a hands-free manner. And the person can carry the baby seat for extended periods of time without fatigue since the baby seat hangs from the shoulder or torso rather than having to be actively grasped and lifted, as is the case with a handle.

Unfortunately, this is not presently possible in a universal manner. While a baby seat can be designed with specific features so that it can be suspended from above, it is not possible to take an existing car seat with an unknown or unstudied design and safely suspend it. An existing car seat or one with an unknown or unstudied design requires modifications specific to that seat in order to safely suspend it from above. And such modifications may not even be possible because modifying the design could render the car seat unsafe or unsuitable for its intended primary use.

Thus a need presently exists for a baby seat sling for suspending a baby seat—any baby seat—from a structure and to do so without having to modify the baby seat, without compromising the safety of the car seat for its intended primary use, and without having to know or understand the particular and specific design elements of the baby seat.

SUMMARY

A baby seat sling suspends a baby seat from a structure. The baby seat has a rigid portion, a head end, a foot end, a left side, and a right side. The rigid portion comprises a rigid shell having a contoured front surface for supporting a child and a contoured rear surface opposite the seating surface. The rigid portion comprises rigid extensions extending from the rigid shell. The baby seat sling comprises a lower strap harness that extends around the rear surface of the baby seat. The lower strap harness comprises a head-end lower strap comprising a first strap end, a second strap end, and an intermediate portion. The intermediate portion is disposed on the contours of the rear surface of the head end of the baby seat. The lower strap harness further comprises a foot-end lower strap comprising a first strap end, a second strap end, and an intermediate portion. The intermediate portion is disposed on the contours of the rear surface of the foot end of the baby seat. The baby seat sling further comprises a lower strap suspension point extends above the seating surface of the baby seat. The lower strap suspension point comprises a junction of the first end and the second end of the head-end lower strap and the first end and the second end of the foot-end lower strap. Additionally, the baby seat sling comprises an upper suspension strap attached to the lower strap suspension point and to the structure located above the baby seat. The upper suspension strap comprises an upper strap first end, an upper strap second end, and an upper strap intermediate portion.

BRIEF DESCRIPTION OF THE DRAWINGS

FIGS. 5A-F show additional details of the baby seat sling of FIG. 5.

FIG. 9 shows a left side elevation view of a baby seat sling.

FIG. 10 shows a right side elevation view of a baby seat sling.

DETAILED DESCRIPTION

Figure 1:
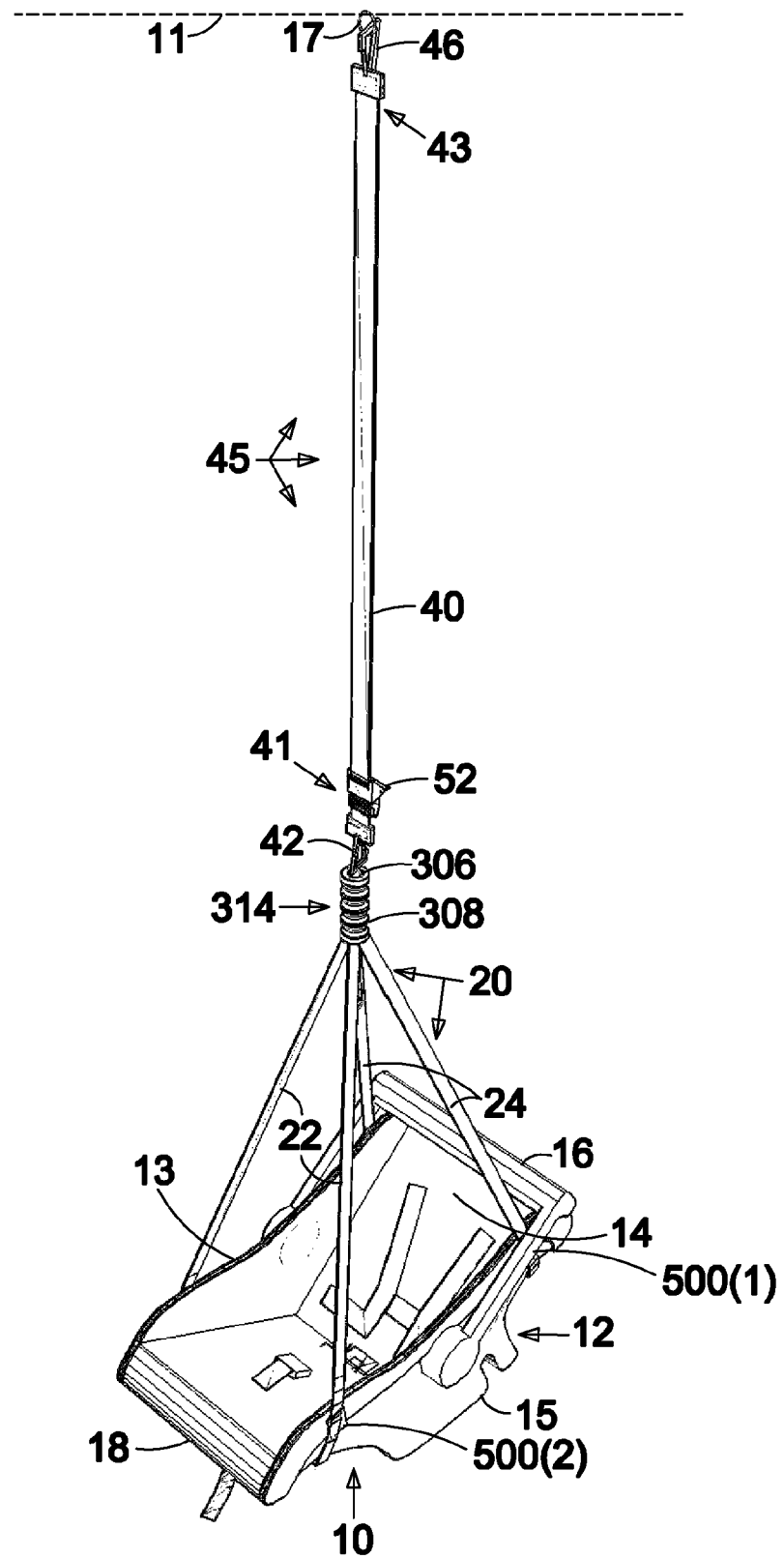
FIG. 1 shows a perspective view of a baby seat sling with an exemplary baby seat.
Figure 2:
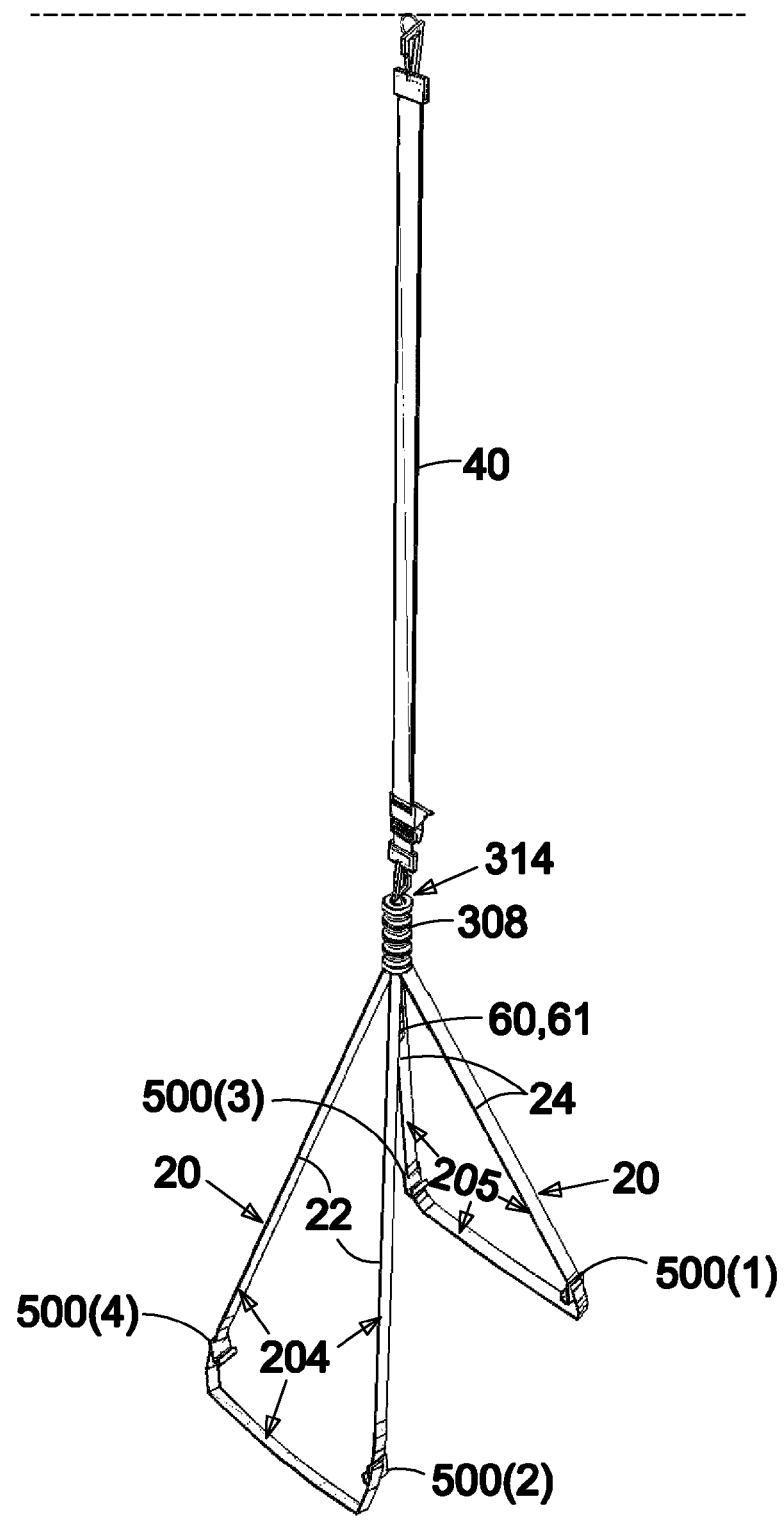
FIG. 2 shows a perspective view of a baby seat sling without an exemplary baby seat.

FIG. 1 shows a perspective view of a baby seat sling with an exemplary baby seat. The baby seat 10 is suspended from a structure which is symbolically represented by dotted line 11. The exemplary baby seat 10 is shown for illustrative purposes only. FIG. 2 shows a different perspective view of a baby seat sling without the exemplary baby seat.

A lower strap harness 20 extends around the rear surface 12 of the baby seat 10. The lower strap harness 20 comprises a head-end lower strap 24 and a foot end lower strap 22. The baby seat has a head end 16, a foot end, 18, a right side 13, and a left side 15. Only the rigid portion of the exemplary baby seat 10 is illustrated but it is understood that the baby seat may comprise additional elements.

FIGS. 3A-F show the components of and a method of making a lower strap suspension point 314 and the lower strap harness 20. The lower strap suspension point 314 extends above the seating surface 14 of the baby seat 10 and comprises a junction of the ends (300, 302) of the head-end lower strap (24, 310) and the foot end lower strap (22, 300). The lower strap suspension point provides a means for connecting opposing sections of the strap(s) together at an area above the front surface of the baby seat. The lower strap suspension point 314 further provides a means for connecting additional elements to the lower strap harness 20, as will be disclosed below.

The lower strap harness 20 comprises at least one strap 310. The strap has a first strap end 300, a second strap end, and an intermediate portion 304. Straps are well known by those having ordinary skill in the art. The strap is long and generally flat, and may be variable in length. The strap could alternatively be generally tubular like a rope. By "long" it is meant that the strap has a length such that when the intermediate portion 304 of the strap is approximately centered on the bottom of the baby seat and the two ends 300, 302 are extended around the sides of the baby seat, the two ends come together at a point at least one foot above the baby seat. In one example the strap is a nylon webbing, has a length of at least 13 feet, a width of 1 inch, and a thickness of around 0.04 of an inch. Nylon webbings like this are extremely strong, typically able to withstand tensions of thousands of pounds. The strap may comprise other materials, alone and in combination, such as cotton, polypropylene, and polyester.

Figure 3:
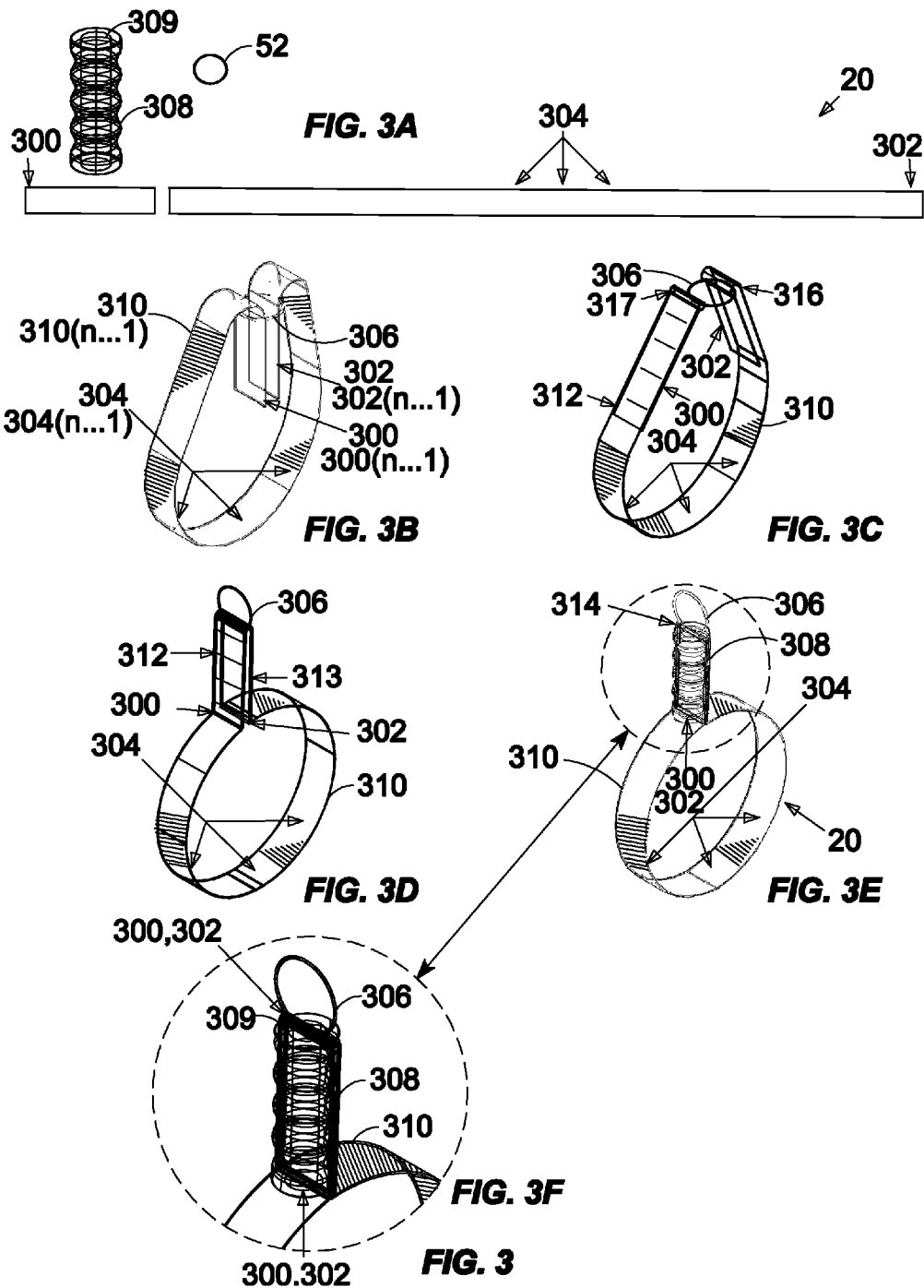
FIGS. 3A-F show the components of and a method of making a lower strap harness and a lower strap suspension point.

As shown in FIG. 3A, the lower strap harness also includes a ring such as a metal ring 306. The lower strap harness comprises at least one strap 310. The lower strap harness 20 of FIG. 1 comprises two straps. For simplicity of illustration, FIG. 3 shows how to make a lower strap harness with one strap, but a lower strap harness with multiple straps can be made in exactly the same manner as shown and described for a single strap. This is illustrated in FIG. 3B where the strap(s) is/(are) labeled 310(1 . . . n), strap ends 300(1 . . . n) and 302(1 . . . n), and intermediate section(s) 304(1 . . . n). For multiple straps, the method described below is carried out for each strap 310(1 . . . n).

So, in FIG. 3B the ends 300, 302 are passed through the ring 306 (or in the case of multiple straps 310(1 . . . n), the ends 300, 302 of each strap 310(1 . . . n) are passed through the ring 306).

Next, as shown in FIG. 3C, each strap end 300, 302 is connected to the ring 306. Specifically, the first end 300 is connected 312 onto itself to form loop 317. In the illustration, the second end 302 has been folded back onto itself but has not yet been connected to itself in order to illustrate an intermediate step of the method. In FIG. 3D the second end 302 is connected 313 to itself thereby forming loop 316 that connects the second end 302 looped connection with the ring 306. FIG. 3D illustrates the strap 310 with both ends connected (312, 313) to the ring 306. If there are additional straps 310(1 . . . n) then each end of each strap is folded back onto and connected to itself in the same manner, thereby connecting both ends of every strap 310(1 . . . n) to the ring 306. The strap ends may be connected (312, 313) by sewing them together or by any other means.

Next, the strap ends (300, 302) are connected to each other. If there is more than one strap 310(1 . . . n) then all strap ends are connected together. The strap ends (300, 302) may be connected by sewing them together.

FIGS. 3E and 3F show another way of connecting the straps ends to one another. The intermediate section 304 (or, for more than one strap, the intermediate sections 304(1 . . . n)) are passed through a channel 309 (FIGS. 3A, 3E, 3F) in a handle 308 (FIGS. 3A, 3E, 3F). The handle 308 is advanced towards the ring 306 thereby joining opposing section of the strap(s) (300, 302) above the front surface of the baby seat 14. Advancing the handle 308 snugly toward the ring further cinches the strap(s) together and to the ring 306 to reinforce a strong junction 314. The handle 308 shows only one exemplary design which has an interior channel 309. It is appreciated that other designs are possible. For example, the handle may have an opening or slit extending from the interior channel through to the exterior of the handle thereby forming an lengthwise end-to-end slit or opening into which the straps can be guided through the side of the handle to the interior channel.

In addition to connecting opposing sections of the strap 310 together, the ring 306 provides a connection point for clasps, ropes, straps, hooks, and the like. It is noted that FIG. 3 shows only one method of building a lower strap harness and that there are many other ways to build the harness with many types of materials. For example, a harness can be built following all of the steps detailed above but without a metal ring. Instead, one or more of the loops (316, 317, FIG. 3C) formed by the strap 20 provide the connection point. Or the ends (300, 302) can be sewn together and a hook, clasp, buckle, eyelet, or retractable reel (1602 of FIGS. 16A-B) attached to the connected ends. These and other modifications can be made alone and in combination.

One other modification includes an accessory attachment strap 60 that is connected, for example sewn, to the lower strap suspension point 314. The accessory attachment strap 60 is for attaching accessories to the lower strap suspension point. The accessory attachment strap 60 extends generally towards the seating surface 14 of the baby seat 10. An exemplary accessory attachment strap 60 is shown in FIGS. 2, 5, 7, 8, 9, 10, and 12 and includes a short strap 60 with a connector 61 such as a ring, clasp, or hook attached to the strap's free end (the end not sewn to the lower strap suspension point 314). Accessories such as toys, ornaments, and the like may be attached to the connector so that they hang within sight or reach of a baby in the baby seat.

Figure 4:
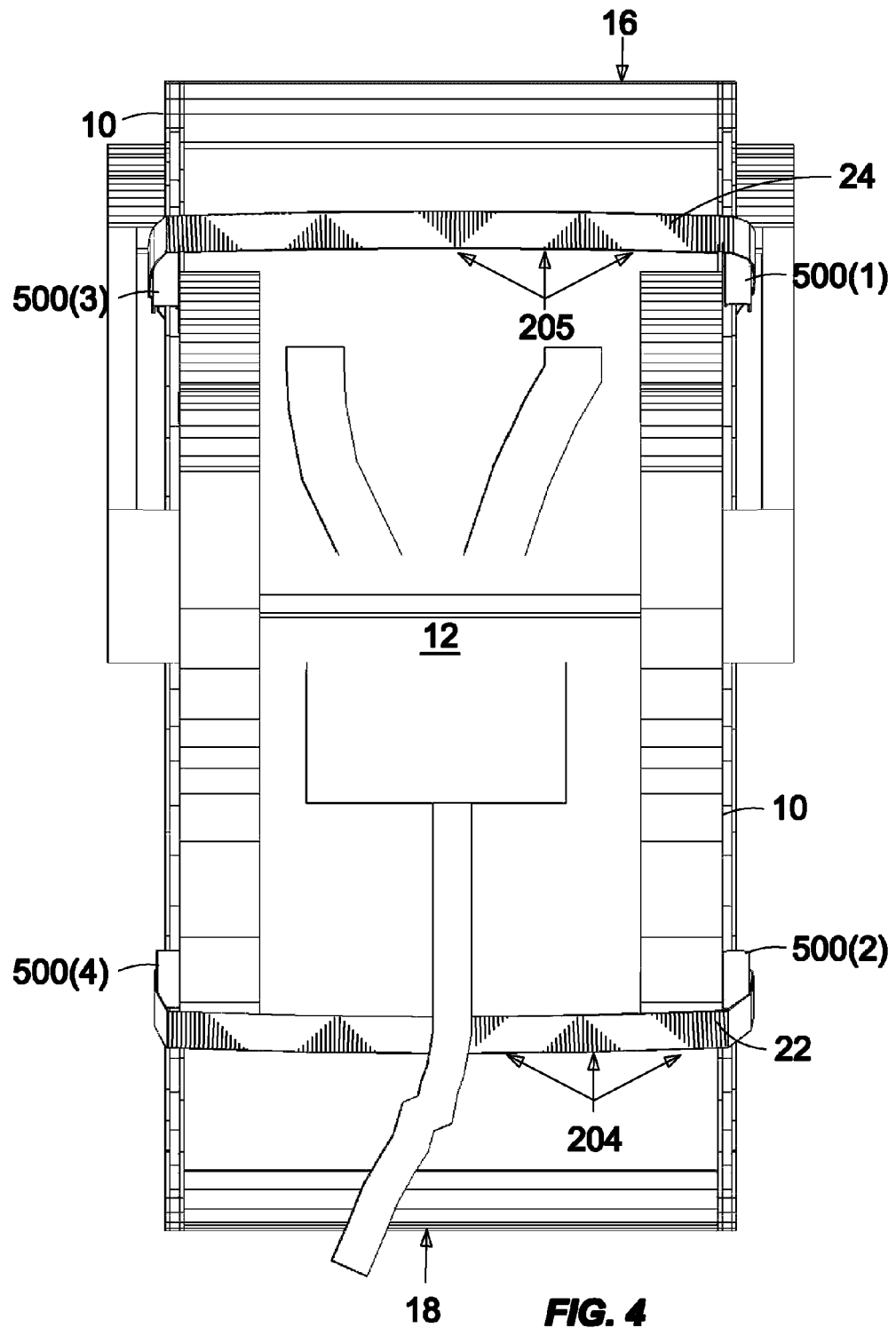
FIG. 4 is a bottom plan view of the baby seat sling with the exemplary baby seat shown in FIG. 1.

FIG. 4 is a bottom plan view of the baby seat sling with the exemplary baby seat shown in FIG. 1. Referring to FIGS. 1-4, the lower strap harness 20 comprises the head-end lower strap 24 and the foot-end lower strap 22. The lower strap suspension point 314 extends above the seating surface 14 of the baby seat 10 and comprises the junction of the ends of the head-end lower strap 24 and the foot end lower strap 22. The junction of the ends are not visible in FIGS. 1 and 2 due to obstruction by the handle 308, but the junction was disclosed in detail in FIG. 3.

Figure 5:
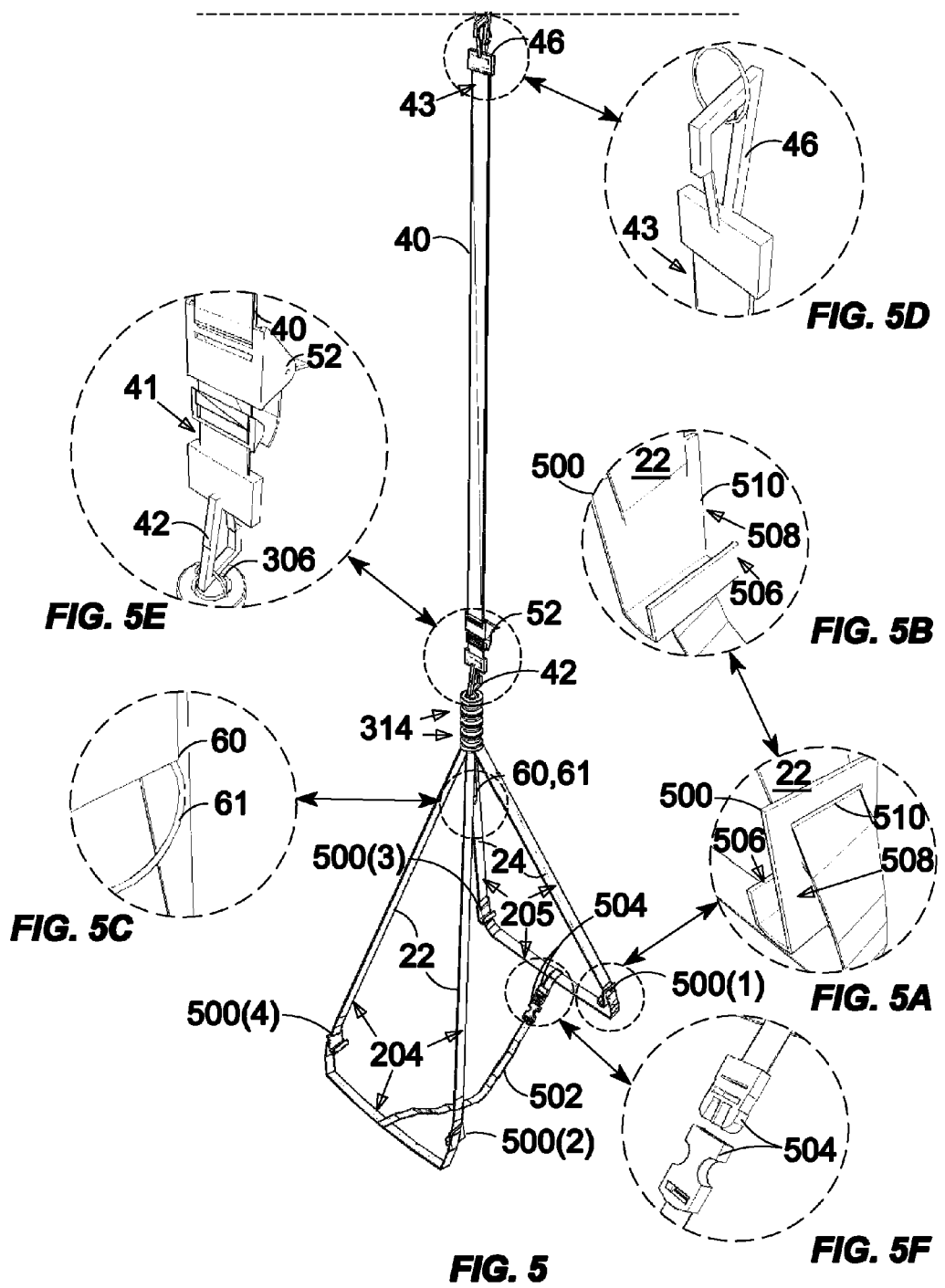
FIG. 5 shows another perspective view of a baby seat sling.

The lower strap suspension point provides a means for connecting opposing sections of the strap (22, 24) together at an area above the front surface 14, of the baby seat 10. The lower strap suspension point 314 further provides a means for connecting additional elements to the lower strap harness 20. For example, as shown in FIGS. 1, 2 and 5, an upper suspension strap 40 comprises a clip 42 which is attached to the lower strap suspension point 314 by way of a metal ring 306.

As shown in FIG. 2, the head-end lower strap 24 has an intermediate portion 205, and the foot-end lower strap 22 comprises an intermediate portion 204. The lower strap harness 20 extends around the rear surface 12 of the baby seat 10. Specifically, with reference to FIG. 4, the intermediate portion 205 of the head-end lower strap 24 is disposed on the contours of the rear surface 12 of the head end 16 of the baby seat 10. And, the intermediate portion 204 of the foot-end lower strap 22 is disposed on the contours of the rear surface 12 of the foot end 18 of the baby seat 10.

Referring to FIG. 1, an upper suspension strap 40 is attached to the lower strap suspension point 314 and to a structure (symbolically represented by dotted line 11) located above the baby seat 10. The upper suspension strap 40 comprises an upper strap first end 41, an upper strap second end 43, and an upper strap intermediate portion 45. A first clip 42 is attached to the upper strap first end 41, and a second clip 46 is attached to the upper strap second end 43.

The upper strap first end 41 is connected to the lower strap suspension point 314. As disclosed above, the lower strap suspension point comprises a metal ring or equivalent, and the first clip 42 of the upper strap first end 41 is removably attached, for example clipped, to the metal ring or equivalent (for example, see 206 of FIGS. 3A-F).

The upper strap second end 43 is connected to the structure 11 located above the baby seat 10. The structure 11 has an exemplary ring 17 attached to it. The second clip 46 of the upper strap second end 43 is removably attached, such as being clipped, to the exemplary ring 17. In one example, the structure is the ceiling in a home and the exemplary ring 17 is an eye-hook that is screwed or bolted into a beam in the ceiling.

The clips 42 and 46 are intended to be just one example of the type of connector or device that can be connected to the upper strap 40 first end 41 and second end 43. Each end (41, 43) may comprise any number and types of connectors or device, or none at all. Each end (41, 43) may comprise different connectors. The connectors may be attached to the end in various way such as by sewing, riveting, bonding, or any other means of fastening. Just a few of the numerous connectors or devices that can be attached to the upper strap first end 41, or the upper strap second end 43, or both include: a ring, a hook, a clasp, a buckle, an eyelet, and a retractable reel. Those skilled in the art will appreciate that many others are possible.

Figures 16A, 16B:
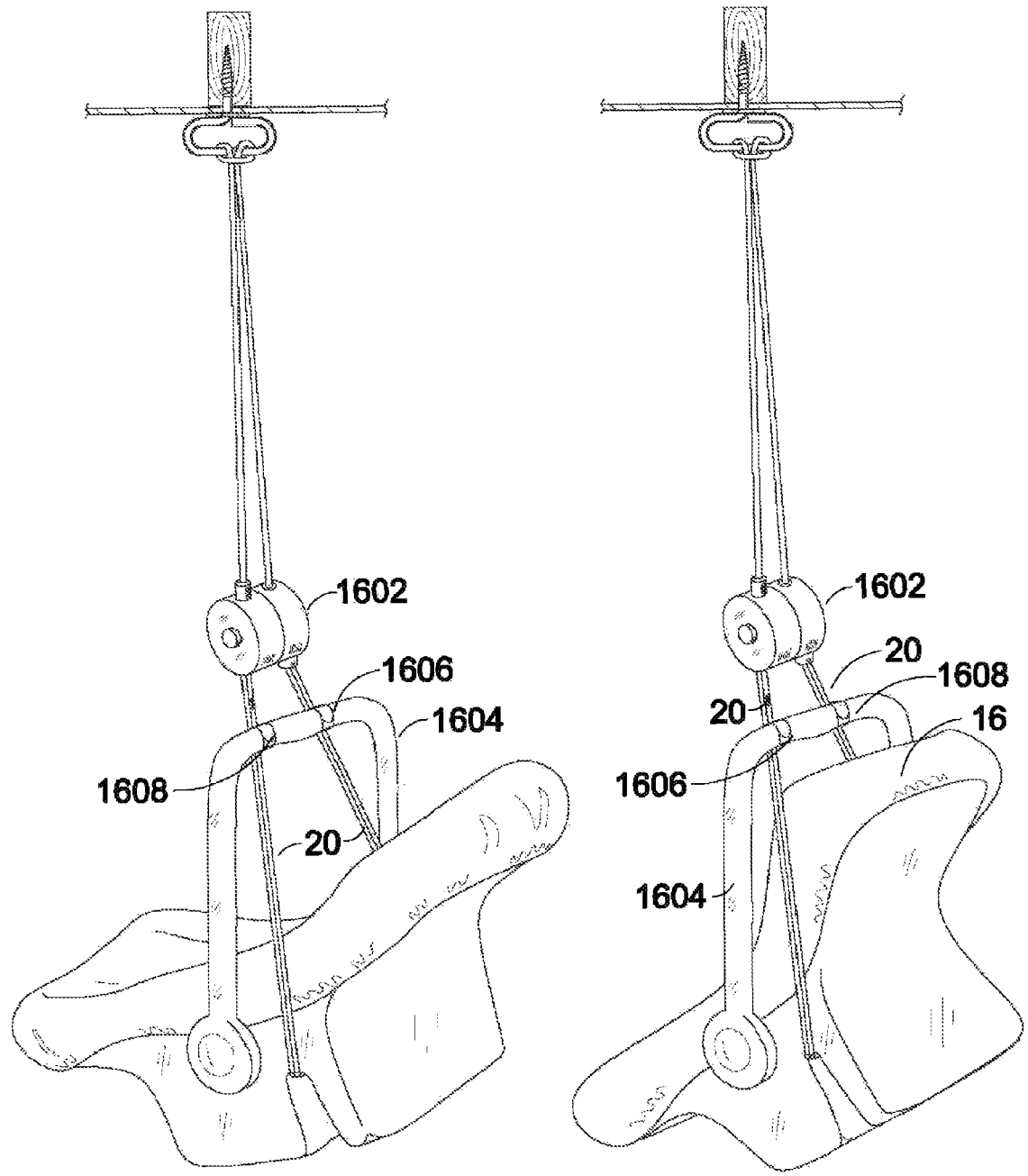
FIG. 16A shows a perspective view of a baby seat sling in a first position with a lower strap extending in front of a rigid extension carrying handle.
FIG. 16B shows a perspective view of a baby seat sling in a second position with a lower strap extending in front of a rigid extension carrying handle.

Similarly, with reference to FIGS. 1 and 3, the lower strap suspension point 314 may comprise at least one of the following attached to the junction of the ends (300, 302 of FIG. 3) of the head end lower strap 24 and foot end lower strap 22: a ring, a hook, a clasp, a buckle, an eyelet, and a retractable reel (1602 of FIGS. 16A-B).

FIG. 5 shows another perspective view of the baby seat sling. FIGS. 5A-F illustrate additional details of the baby seat sling. Some details include a lower strap suspension point 314 including the junction of opposing sections of the straps (22, 24) of the lower strap harness 20. FIG. 5E shows a ring 306 of the lower strap suspension point 314 (also disclosed in FIG. 3). In FIG. 5C, an accessory attachment strap 60 including a connector 61 is connected to the lower strap suspension point 314 and is connected to the lower strap suspension point.

The upper suspension strap 40 comprises a first end 41 shown in greater detail in FIG. 5E, and a second end 43 shown in greater detail in FIG. 5D. Connectors such as clips and rings 42 and 46 are attached to the upper strap first end 41 and upper strap second end 43, respectively.

A length adjustment buckle 52 is attached to the upper suspension strap as shown in FIG. 5E. The length adjustment buckle 52 may be a sliplock-type buckle or any other type of buckle for adjusting the length of a strap. One type of buckle has a generally flat section with transverse generally parallel openings for a webbing to pass through. The arrangements and sizes of the openings allow the strap length to be adjusted when the strap is loosened between the openings. But, when the webbing is pulled taught it is held firmly in place by friction. The buckle may also comprise a moveable lever to lock and release the webbing. These buckles are commercially available, commonly used, and well known by those having ordinary skill in the art.

Also shown in FIG. 5 is a transverse strap 502 connected to the intermediate portion 205 of the head-end lower strap 24 and to the intermediate portion 204 of the foot-end lower strap 24. The transverse strap extends over the rear surface 12 of the baby seat 10 and extends from the head end 16 to the foot end 18. The transverse strap 502 may further comprise a buckle 504, such as a slide-release buckle. One half of the buckle 504 is connected to the transverse strap 502 and the other half of the buckle 504 is connected to one of the intermediate portions 205 of the head-end lower strap 24 or the intermediate portion 204 of the foot-end lower strap 22. When extended over the rear surface 12, the transverse strap provides additional support and stability for the lower strap harness 20 to hold the baby seat 10.

The baby seat sling also comprises at least one clip 500. FIG. 1 shows two clips 500(1) and 500(2). FIG. 4 shows two clips 500(2) and 500(4). FIGS. 2 and 5 show four clips 500(1), 500(2), 500(3), and 500(4). As illustrated in greater detail in FIGS. 5A and 5B, the clip comprises a curved end 506 and an elongated generally flat portion 508 having at least one opening. The arrangements and dimensions of the opening are similar to those of a sliplock-type buckle. The lower strap harness 20 extends through the at least one opening 510 and the curved end is disposed on the rigid portion of the baby seat.

In one example, two opposed clips 500(1) and 500(3) are attached to an intermediate portion 205 of the head-end lower strap 24. The clips are attached to the strap through the openings (for example 506 and 508) in the clips. In this way, the clips are moveable when the strap is slack, and secure to the strap when the strap is taught. One of the opposed clips 500(3) is disposed within a contour of the rear surface 12 of the head end 16 and left side 15 of the baby seat. The other opposed clip 500(1) is disposed within another contour of the rear surface 12 of the head end 16 of the right side 13 of the baby seat 10. One exemplary configuration is shown in FIG. 4.

Similarly, two more opposed clips 500(2) and 500 (4) are attached in a similar matter to an intermediate portion 204 of the foot-end lower strap 22. Each of the opposed clips 500(2) and 500(4) are disposed within a contour of the rear surface 12 of the foot end 18 of the right side 13 of the baby seat 10.

The clips secure the lower strap harness 20 to the baby seat 10, and specifically to the rigid portion of the baby seat. Since nearly all baby seats have different designs, for some baby seats the lower strap harness 20 will be secure without the use of the clips 500. For other baby seats one or more clips 500 may be used to secure the lower strap harness 20.

Depending on the baby seat one or more clips 500 may be attached to the rear surface 15, the front surface, a rigid shell extension, or any other portion of the rigid portion. The one or more clips 500 may be attached to, at, or near the sides 13 and 15. Many baby seats have a deep ridge around the periphery of the rear surface along the sides of the baby carrier. A clip or clips 500 can be secured in this ridge. Securing the clips is a simple matter of identifying a suitable contour and engaging the curved end of the clip with the contour.

Figure 17:
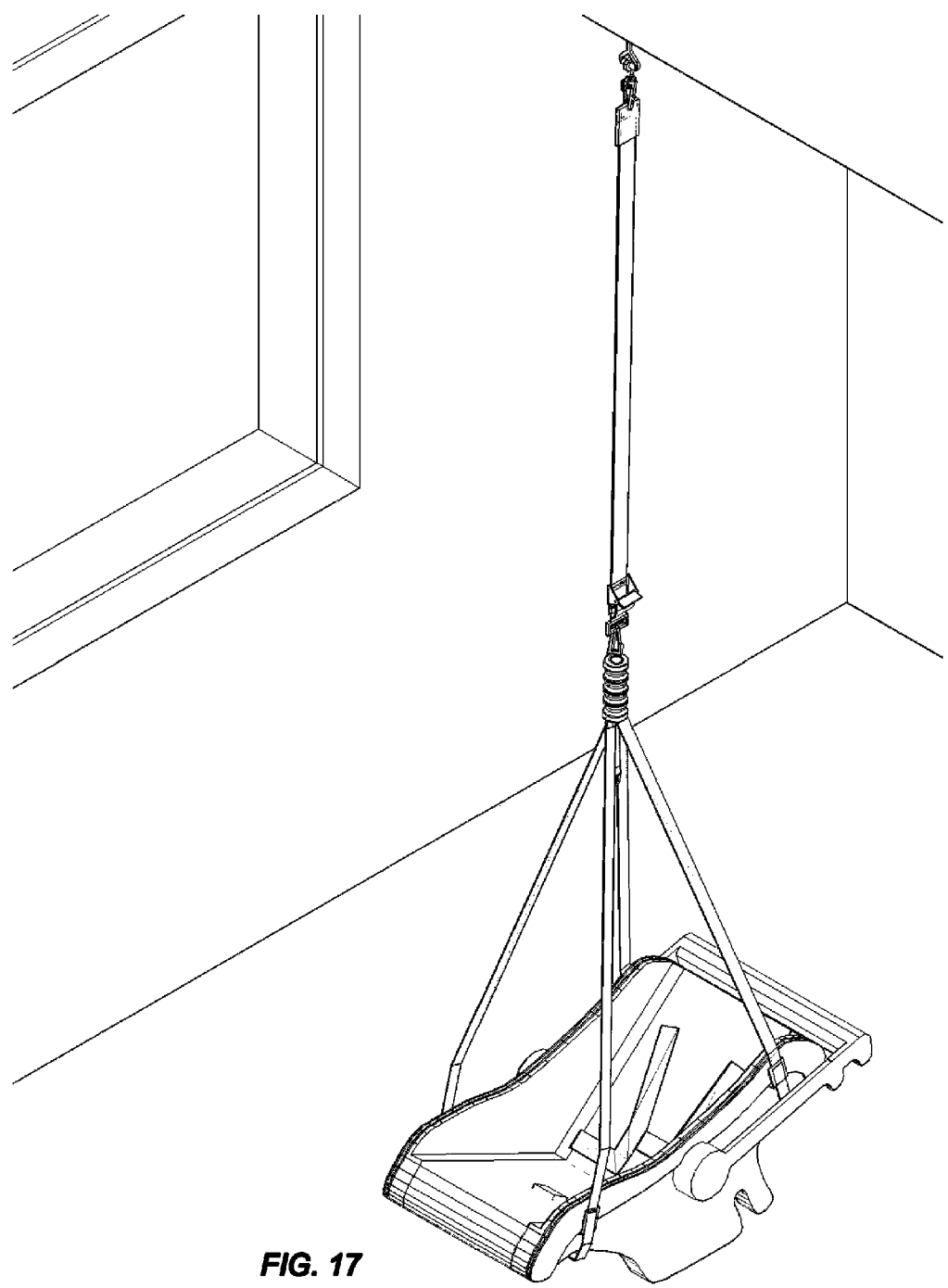
FIG. 17 illustrates a baby seat suspended from a hook on a ceiling.
Figure 18:
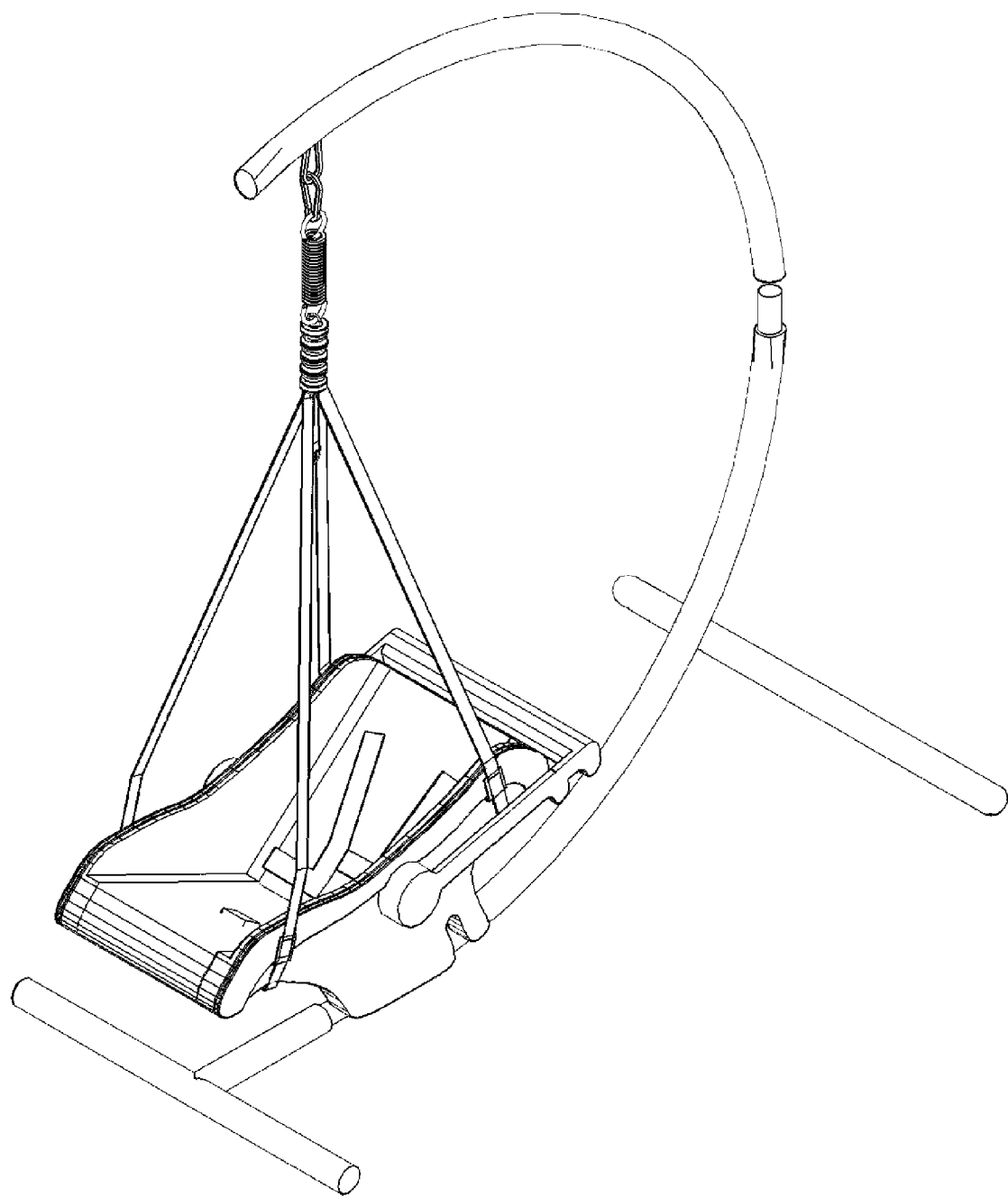
FIG. 18 illustrates a baby seat suspended from a frame placed on the ground.
Figure 19:
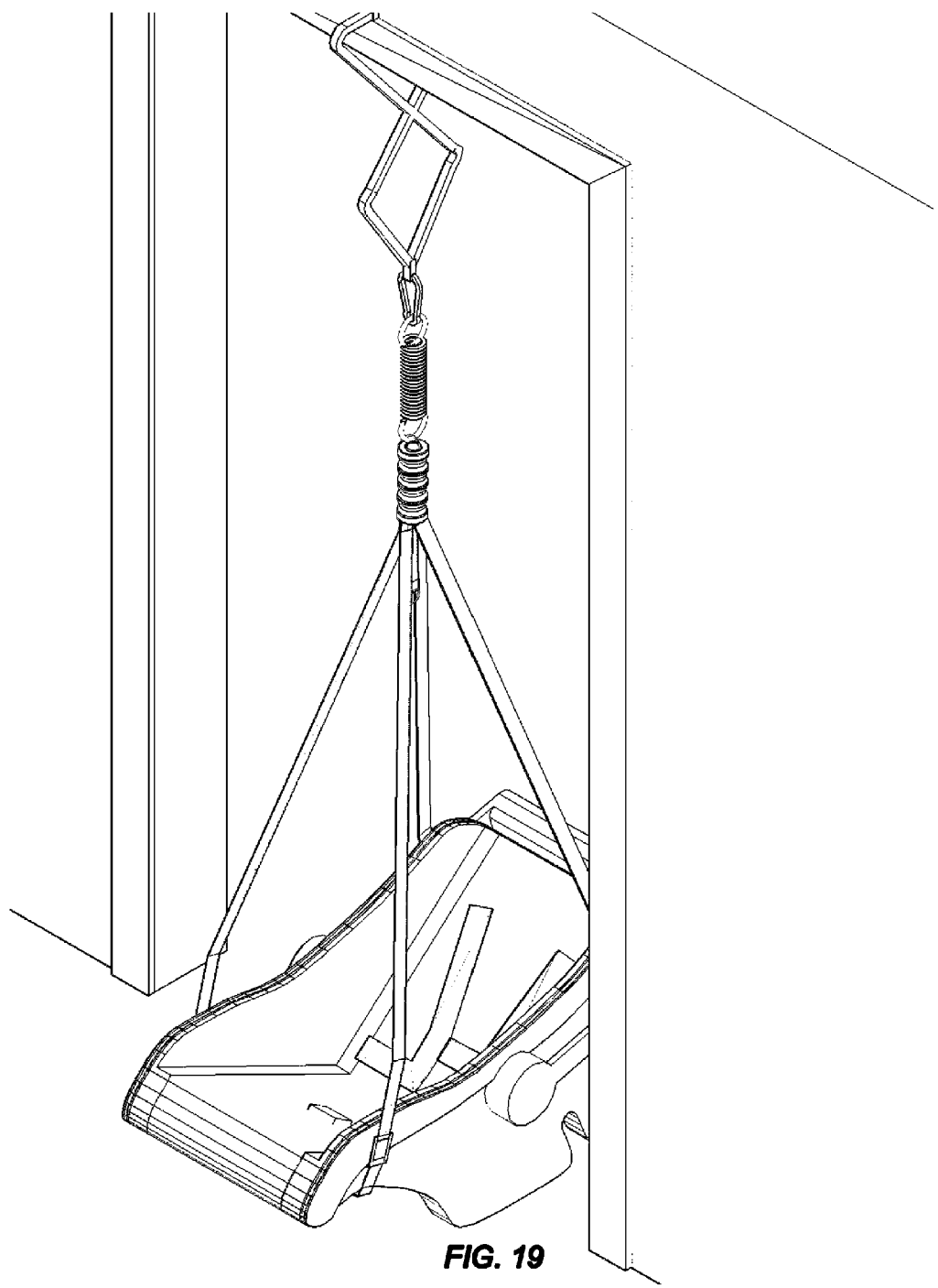
FIG. 19 illustrates a baby seat suspended from a generally horizontal member such as a door frame.
Figure 20:
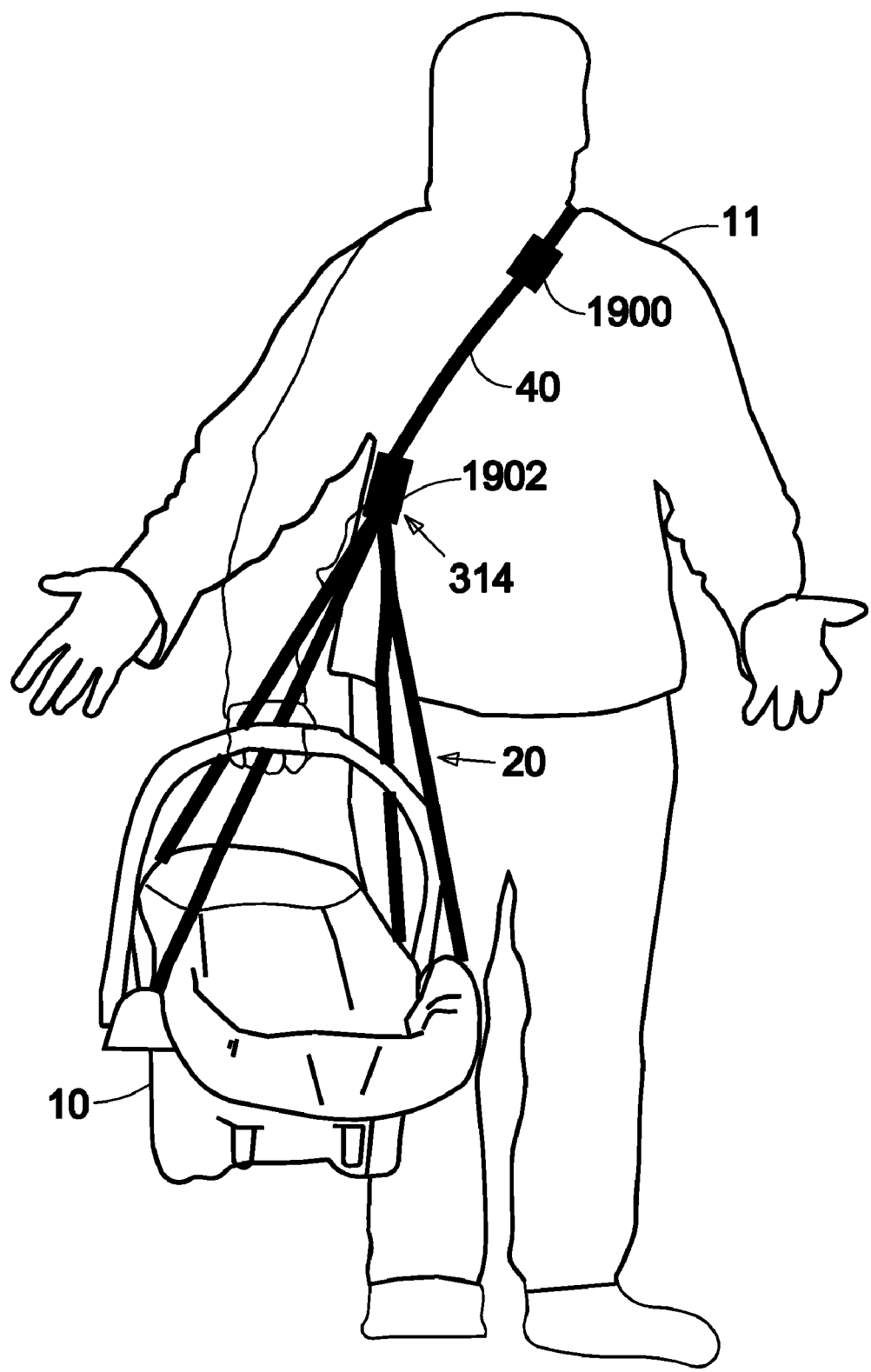
FIG. 20 illustrates a baby seat suspended from a person.

With the above disclosure in mind, some exemplary uses of the baby seat sling are shown in FIGS. 17-20. FIG. 17 illustrates a baby seat suspended from a hook on a ceiling. FIG. 18 illustrates a baby seat suspended from a frame placed on the ground. FIG. 19 illustrates a baby seat suspended from a door frame, which could equivalently represent a tree limb FIG. 20 illustrates a baby seat suspended from a person. With additional reference to FIG. 1, the person (11 of FIG. 20) is the structure (11 of FIG. 1). The upper suspension strap 40 forms a loop so the baby seat can hang from the person's shoulder.

FIGS. 16A and 16B show a perspective view of a baby seat sling with the lower strap harness 20 extending in front of a pivotable carrying handle 1604. The pivotable carrying handle 1604 is a rigid extension extending from the rigid portion of the baby carrier. The lower strap harness 20 may also extend through guides 1606 and 1608 connected to the carrying handle 1604. In one example, the guides 1606 and 1608 are small rings attached to the handle 20 by a hook-and-loop fastener. In this configuration, the angle of the suspended baby seat can be adjusted by pivoting the carrying handle 1604. In FIG. 16A the carrying handle is positioned so the baby seat is in a generally reclined position. In FIG. 16B, the carrying handle 1604 is pivoted toward the head end 16 of the baby seat thereby forcing the baby seat into a less reclined and more vertical position.

Figure 6:
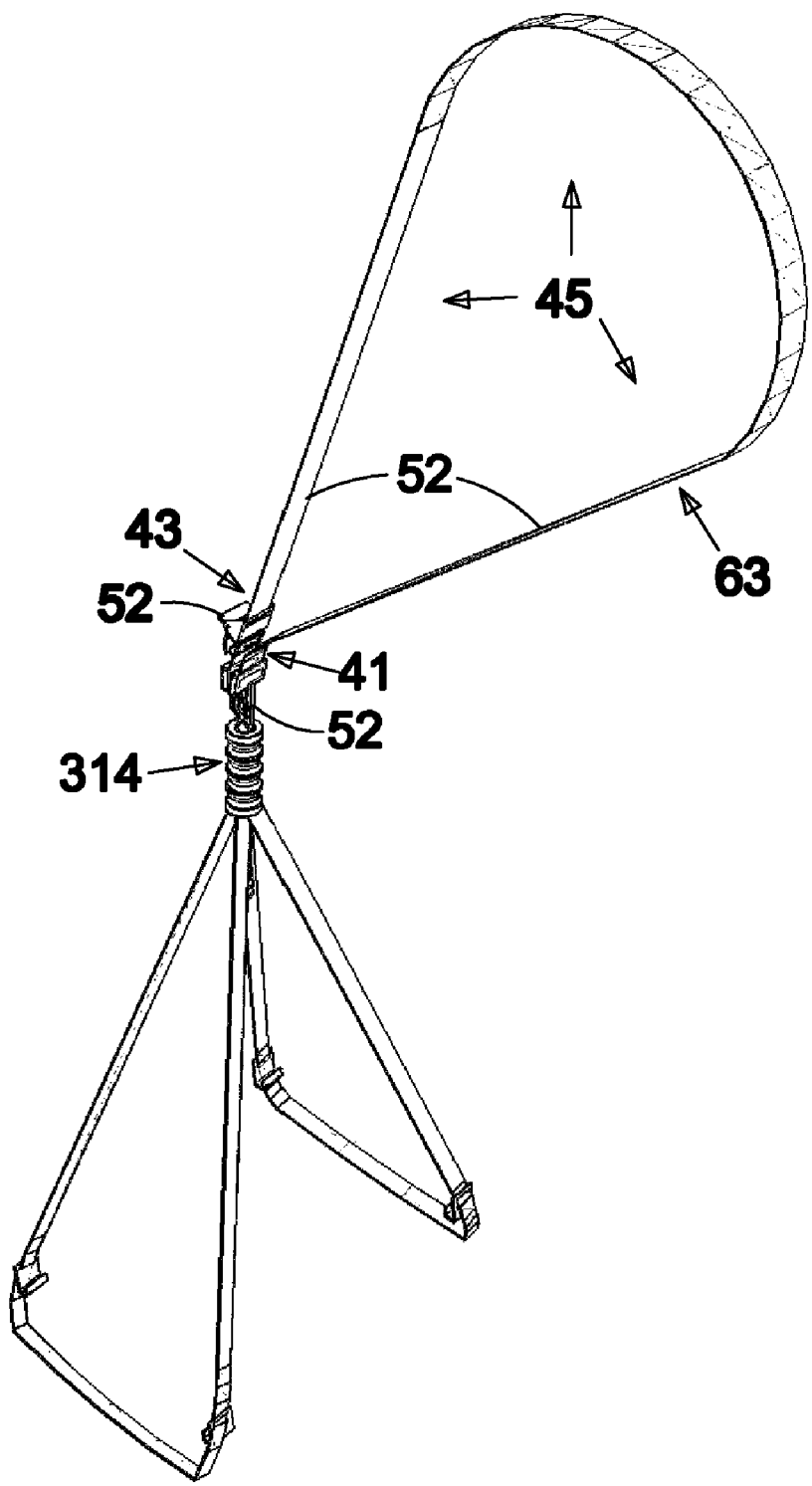
FIG. 6 shows a perspective view of a baby seat sling for suspending a baby seat from a person.
Figures 7, 8:
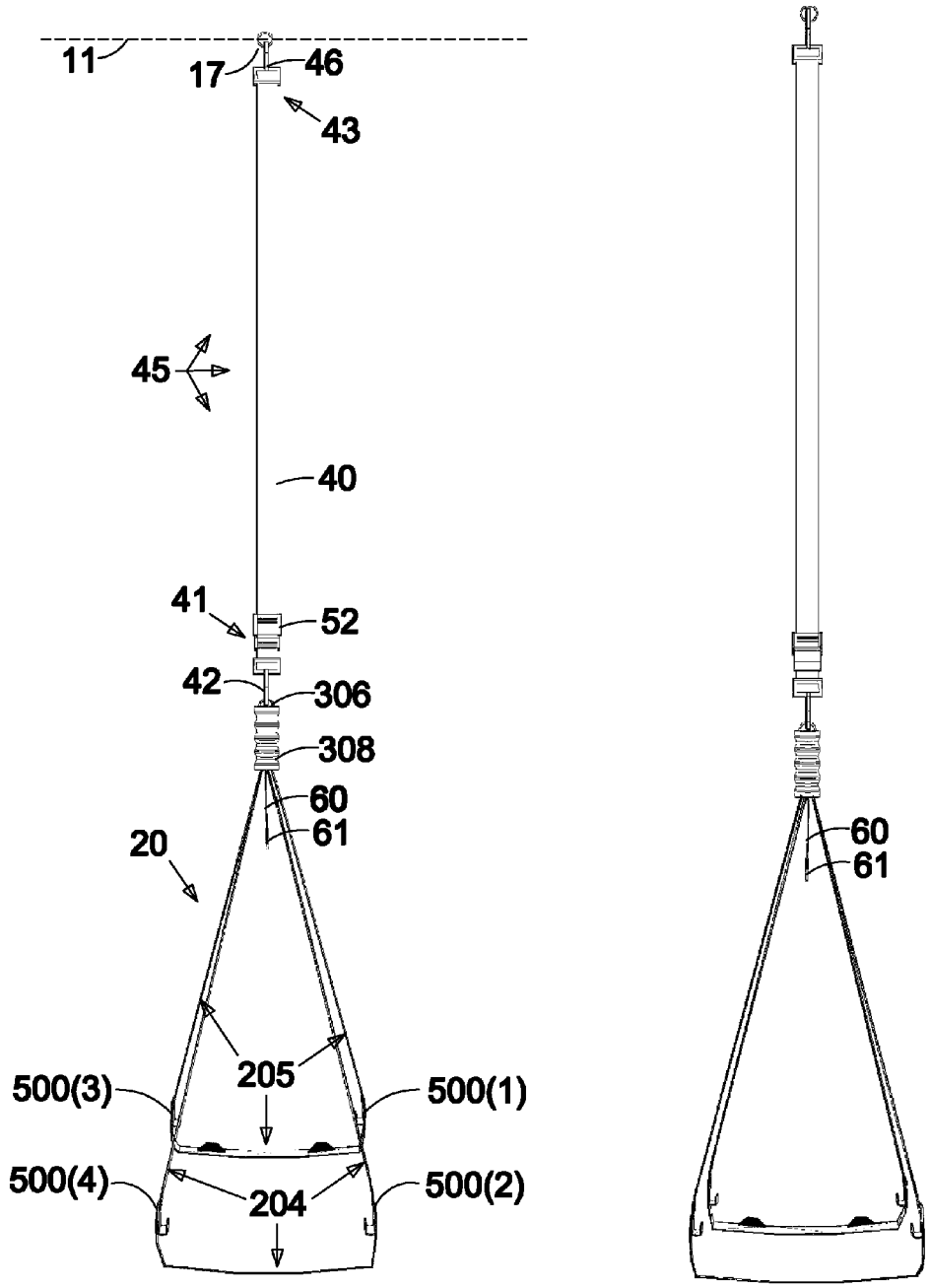
FIG. 7 shows a front, or foot end, elevation view of a baby seat sling.
FIG. 8 shows a rear, or head end, elevation view of a baby seat sling.
Figure 11:
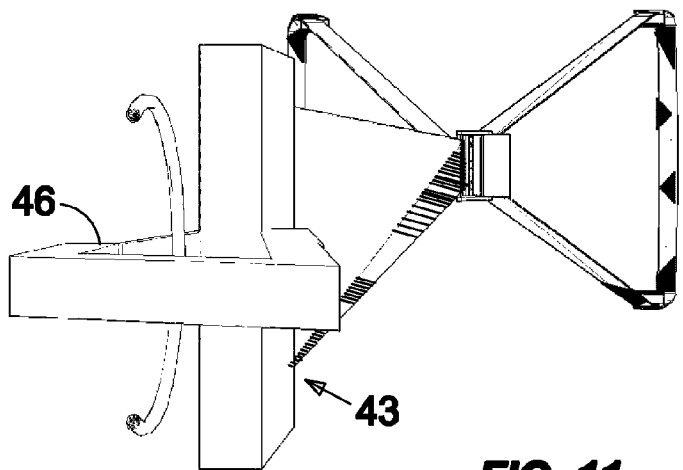
FIG. 11 shows a top perspective view of a baby seat sling.
Figure 12:
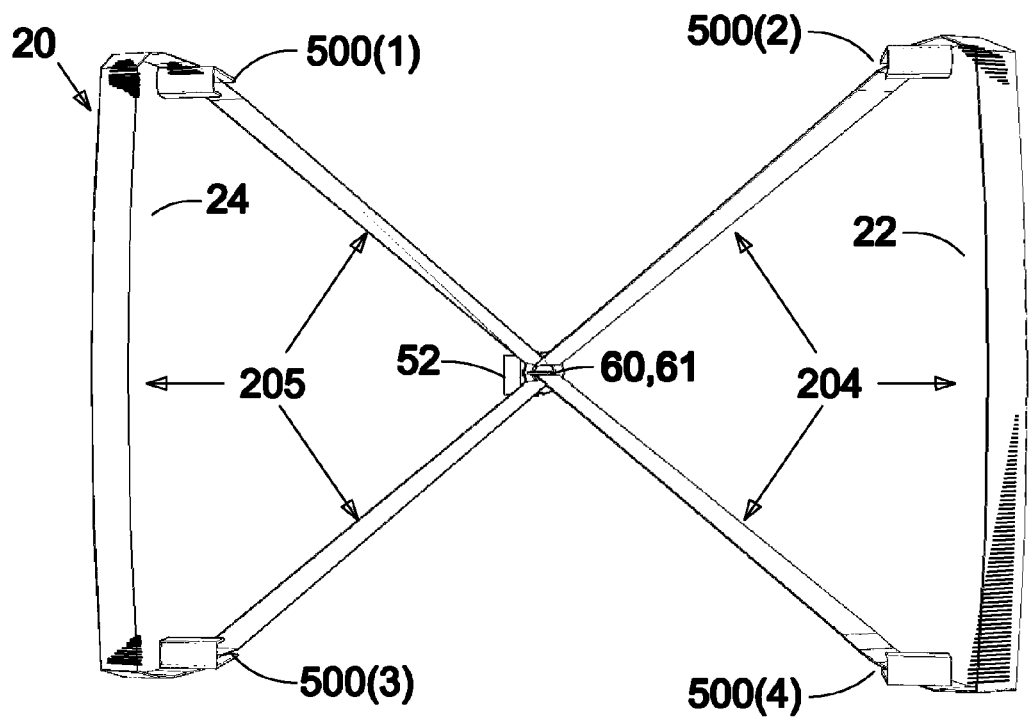
FIG. 12 shows a bottom plan view of a baby seat sling.
Figure 13:
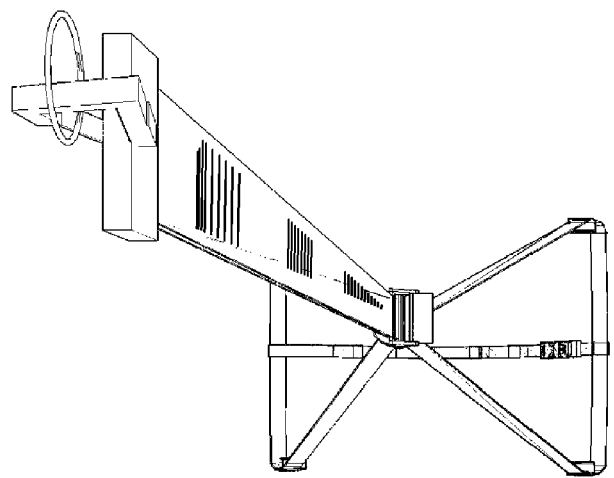
FIG. 13 shows a top perspective view a baby seat sling with a transverse strap.
Figure 14:
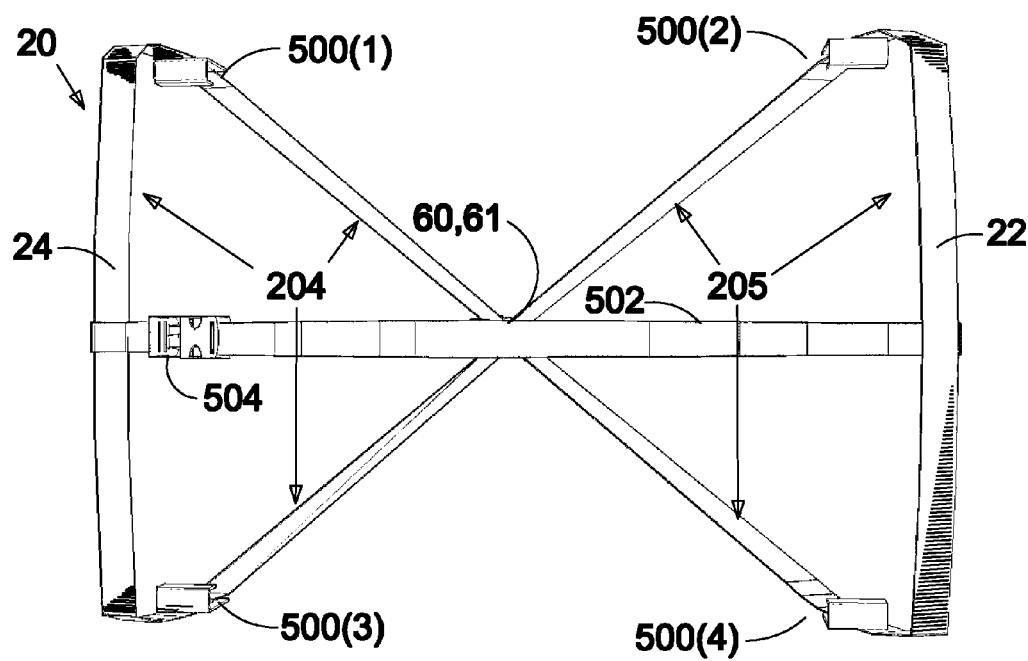
FIG. 14 shows a bottom plan view of a baby seat sling with a transverse strap.
Figure 15:
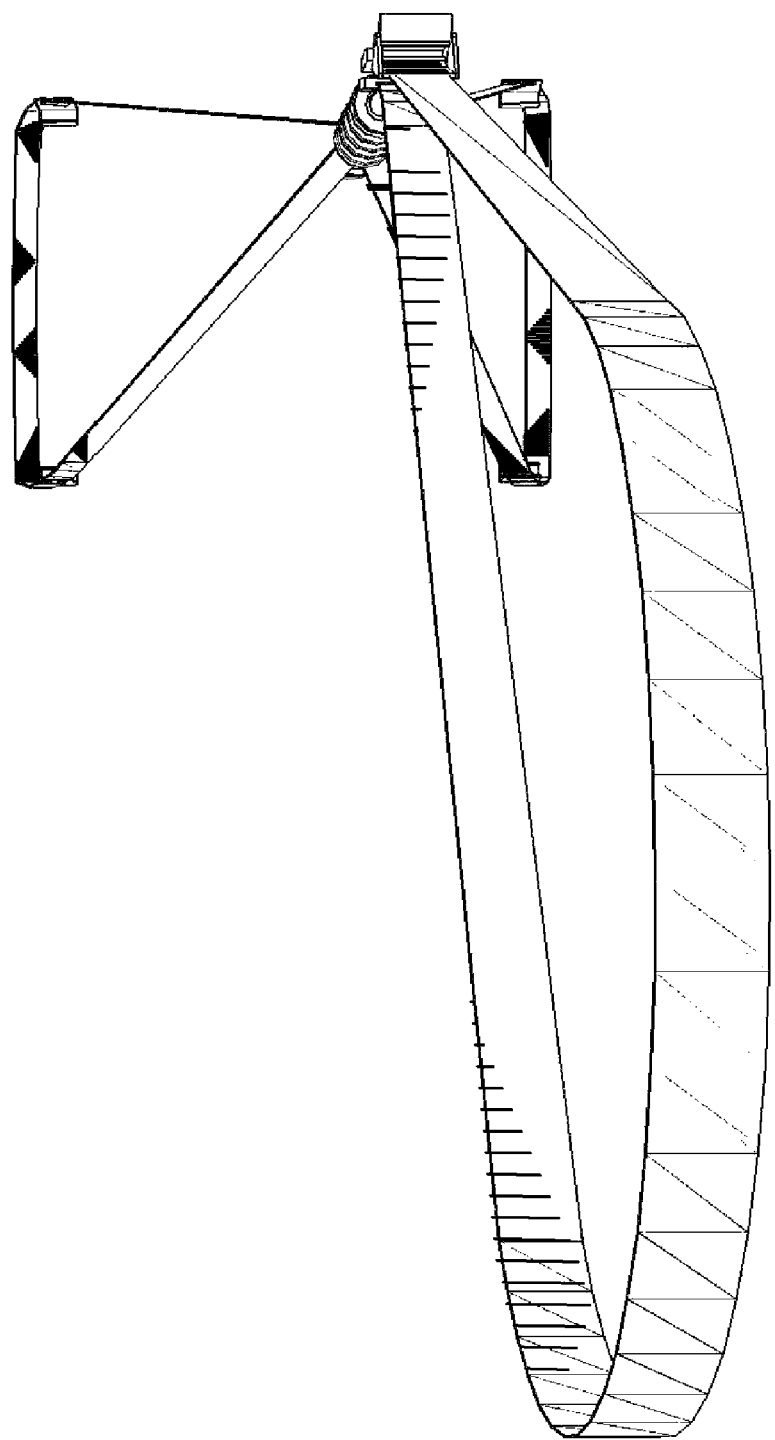
FIG. 15 shows a top perspective view of a baby seat sling for suspending a baby seat from a person.

FIG. 6 shows a perspective view the baby seat sling of FIG. 20. This baby seat sling is identical to that in FIG. 1. In comparing FIGS. 1 and 6, the only difference between them is that in FIG. 1 the upper strap second end 43 is connected to a ceiling 11 or equivalent causing the upper strap 40 to become straight, whereas in FIGS. 6 and 20 the upper strap second end 43 is connected to the lower strap suspension point 314 to form an upper strap loop 60. A length adjustment buckle 52, already disclosed above, is connected to the upper strap 40 for adjusting the size of the upper strap loop 60.

Equivalently, the upper strap first end 41 may be connected to the lower strap suspension point 314 and the upper strap second end 43 extends through the length adjustment buckle 52, thereby forming an upper strap loop 60 that is adjustable in size. The size of the loop 60 may be made smaller by advancing the second end 43 through the buckle in the direction of the lower strap harness 20. The size of the loop 60 may be made larger by withdrawing the second end 43 in a direction away from the lower strap harness 20.

Padding may also be attached to the lower strap harness 20 and the upper suspension strap 40. FIG. 20 shows some exemplary padding 1900 and 1902. Various types of padding may be used such as foam padding, cloth padding, and the like. Depending on the placement of the padding, it can serve various functions such as improving user comfort, or improving the safety of the baby seat sling by, for example, covering and protecting elements such as the lower strap suspension point 314 and connections 42 made to it.

Figure 21:
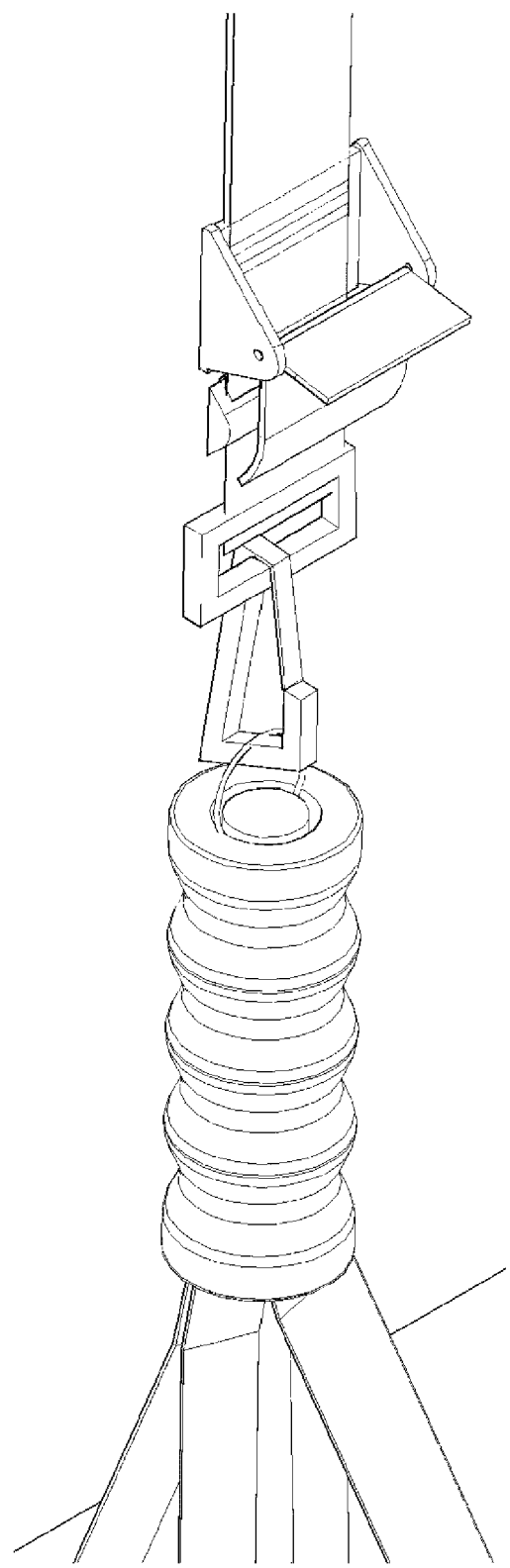
FIG. 21 shows an upper suspension strap attached to a lower strap suspension point and the lower strap extending through a channel in a handle.
Figure 22:
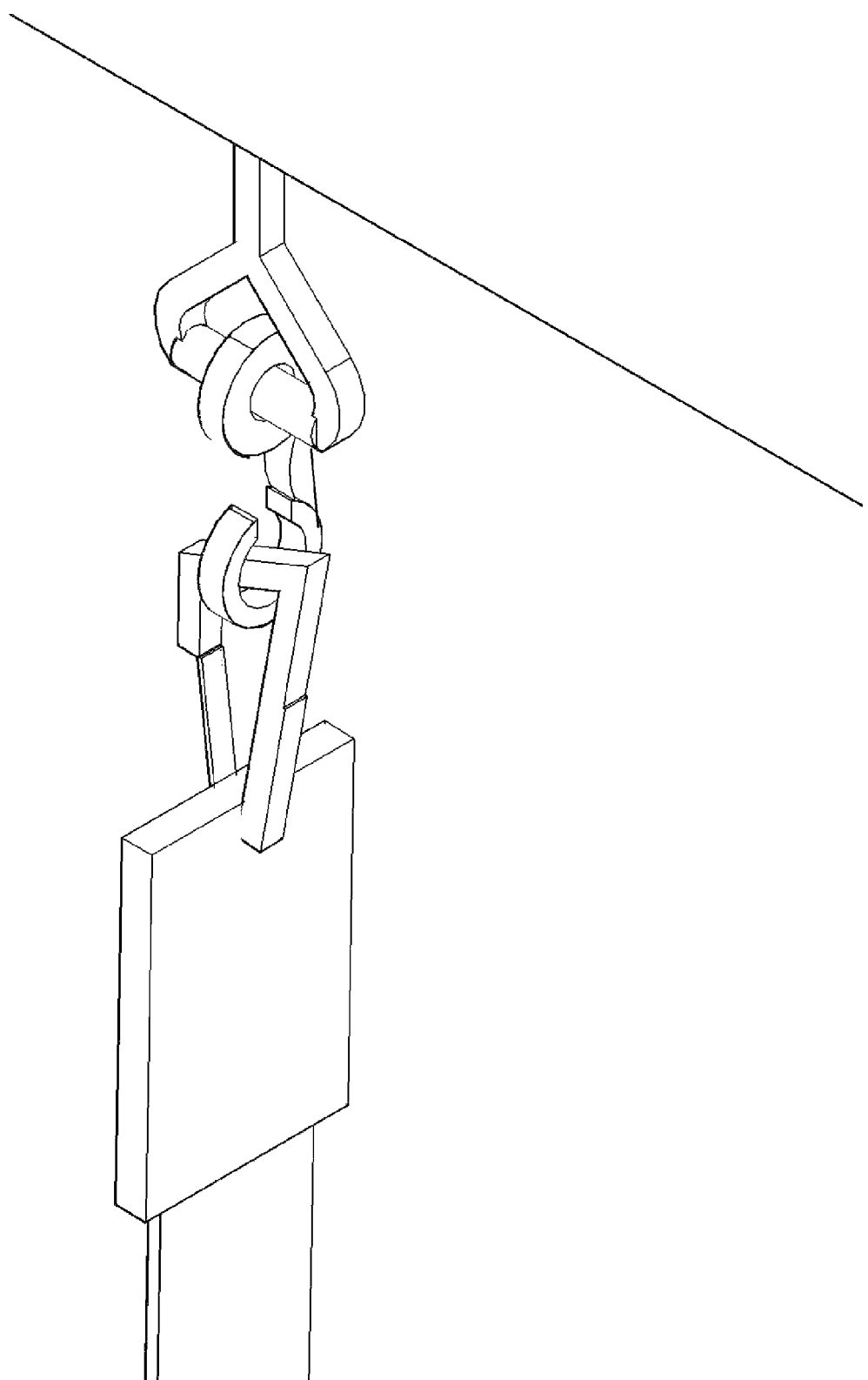
FIG. 22 shows an upper suspension strap attached to a structure above the baby seat.
Figure 23:
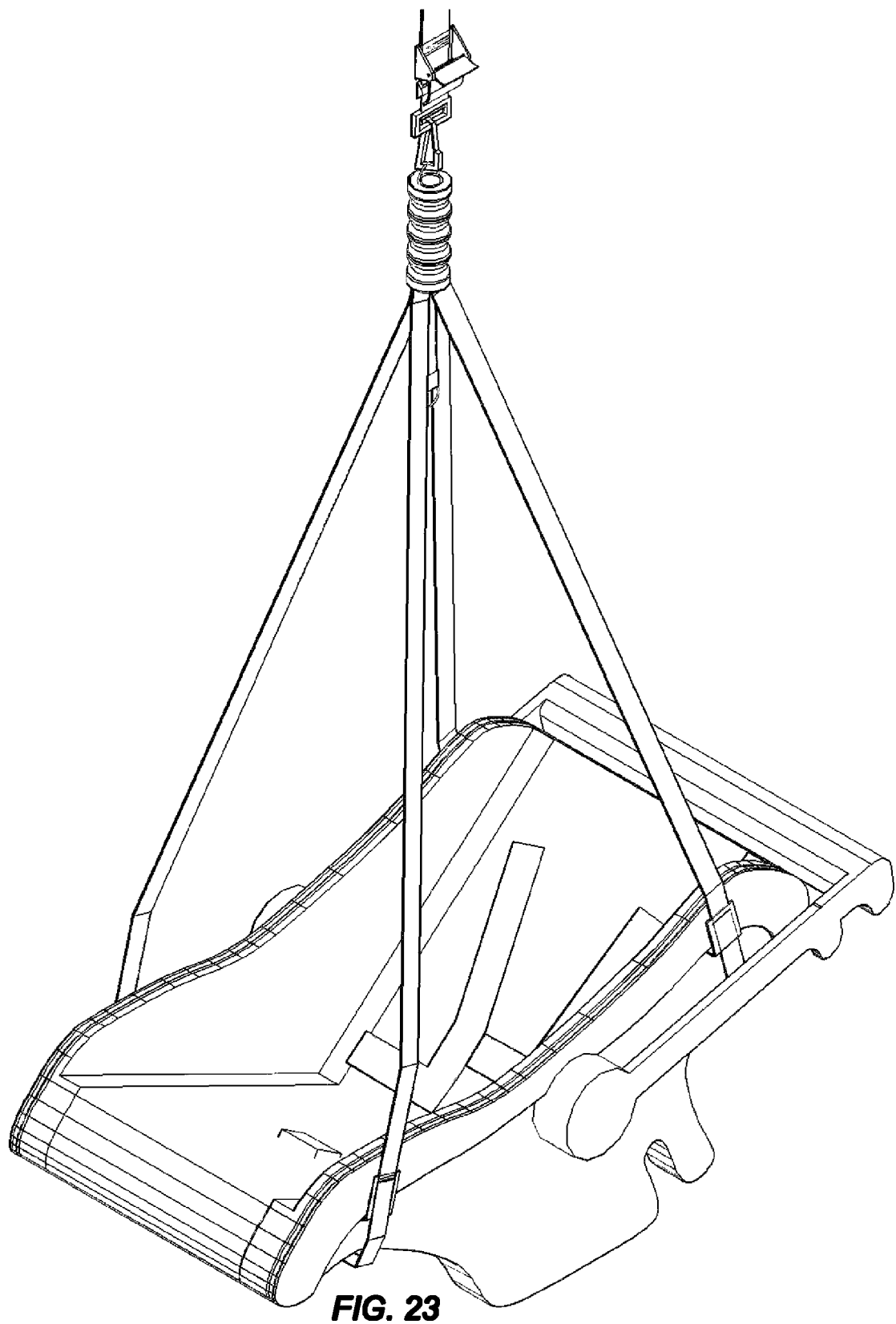
FIG. 23 show a baby seat sling having a lower strap harness, a lower strap suspension point, and an upper suspension strap suspending a baby seat.
Figure 24:
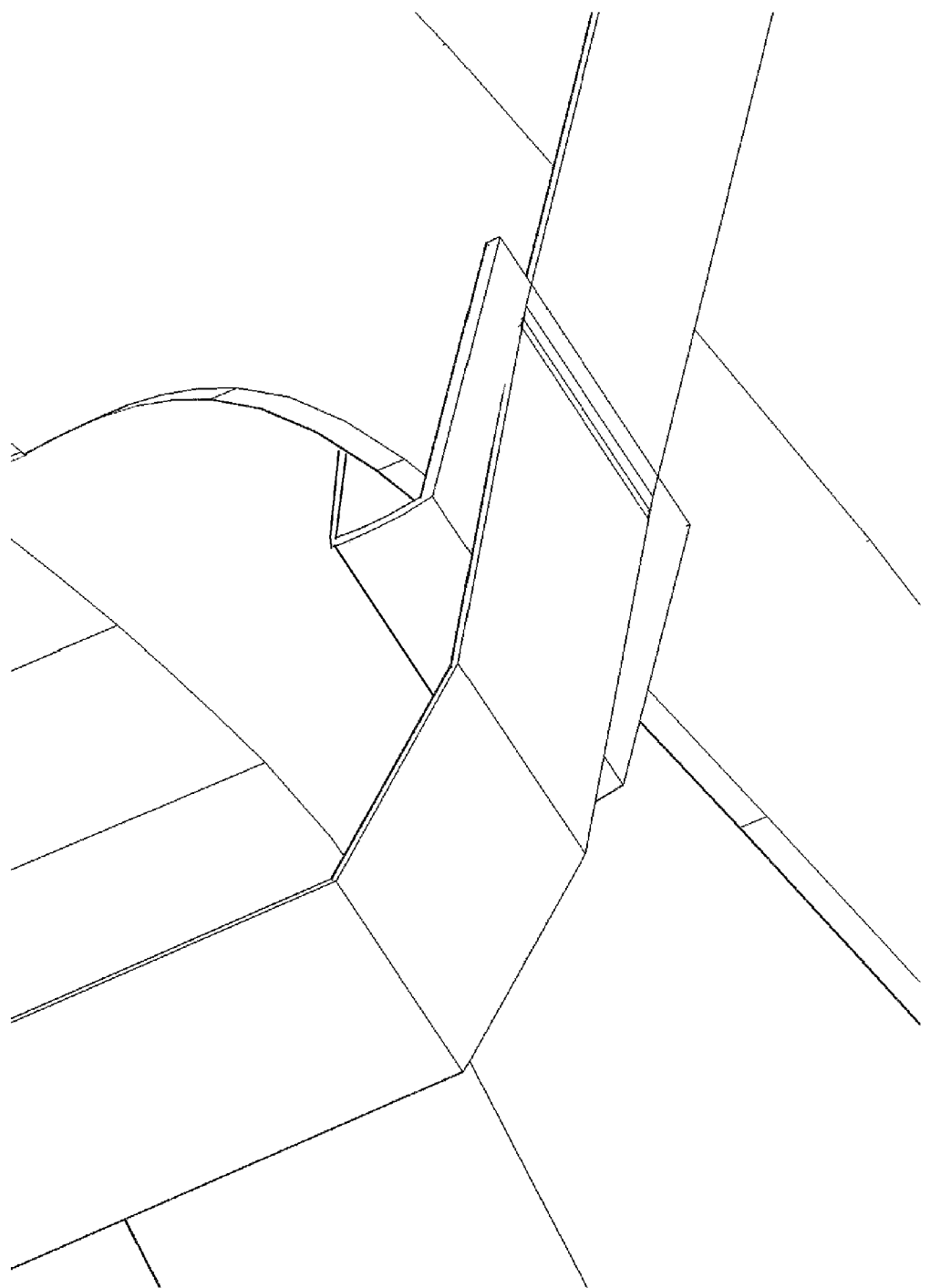
FIG. 24 shows a clip with the lower strap harness extending through an opening in the clip and a curved end of the clip disposed on the rigid portion of the baby seat.
Figure 25:
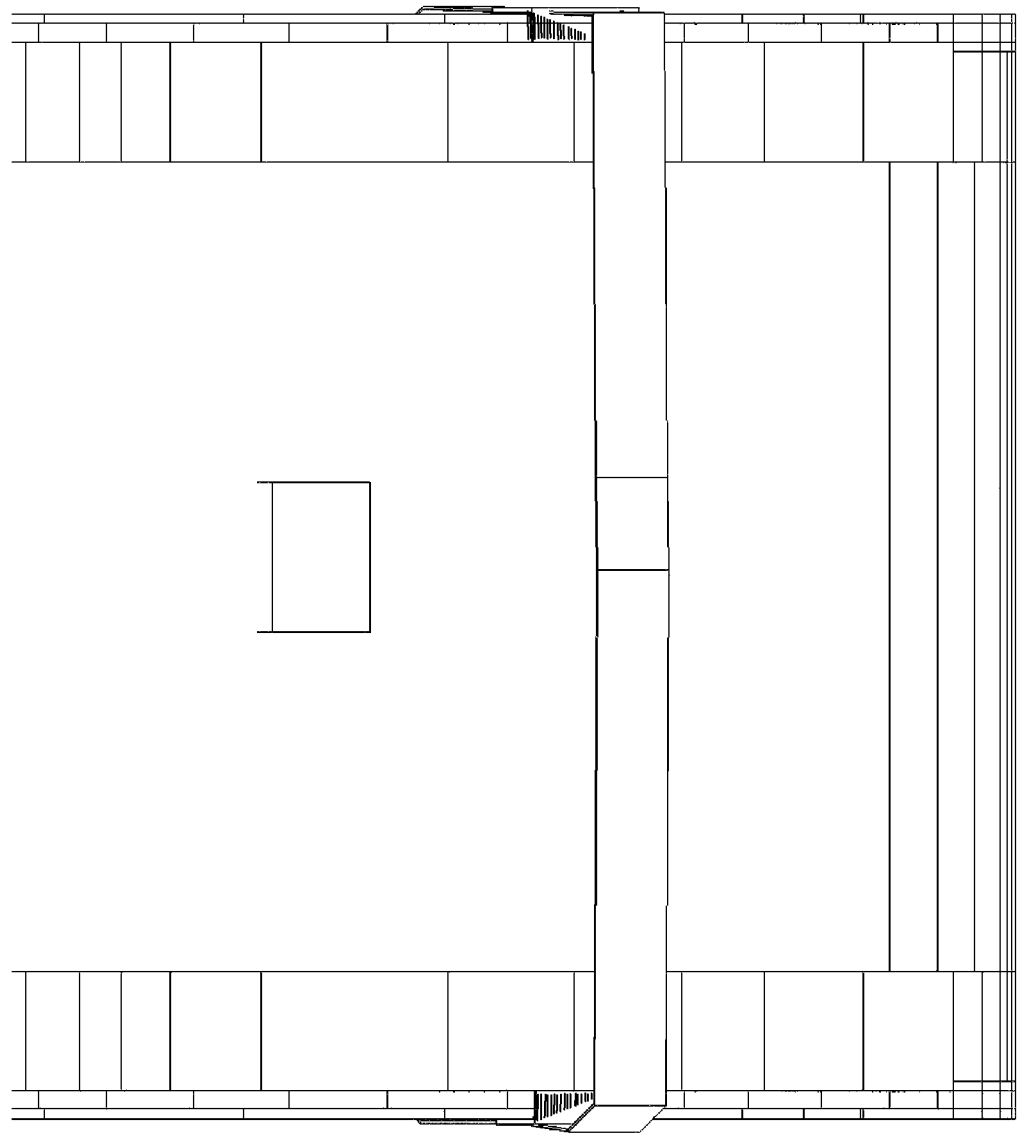
FIG. 25 shows a head-end lower strap disposed on contours of the rear surface of the baby seat, and clips disposed on the rigid portion of the baby seat.
Figure 26:
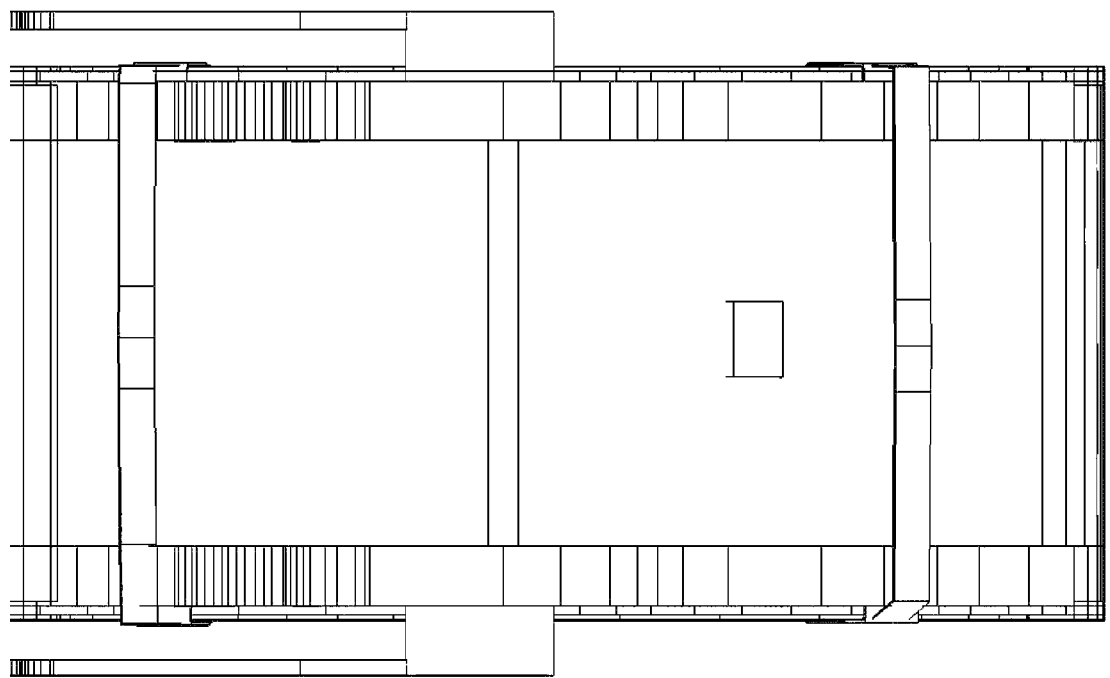
FIG. 26 shows a head-end lower strap and a foot-end lower strap disposed on the contours of the rear surface of baby seat.
Figure 27:
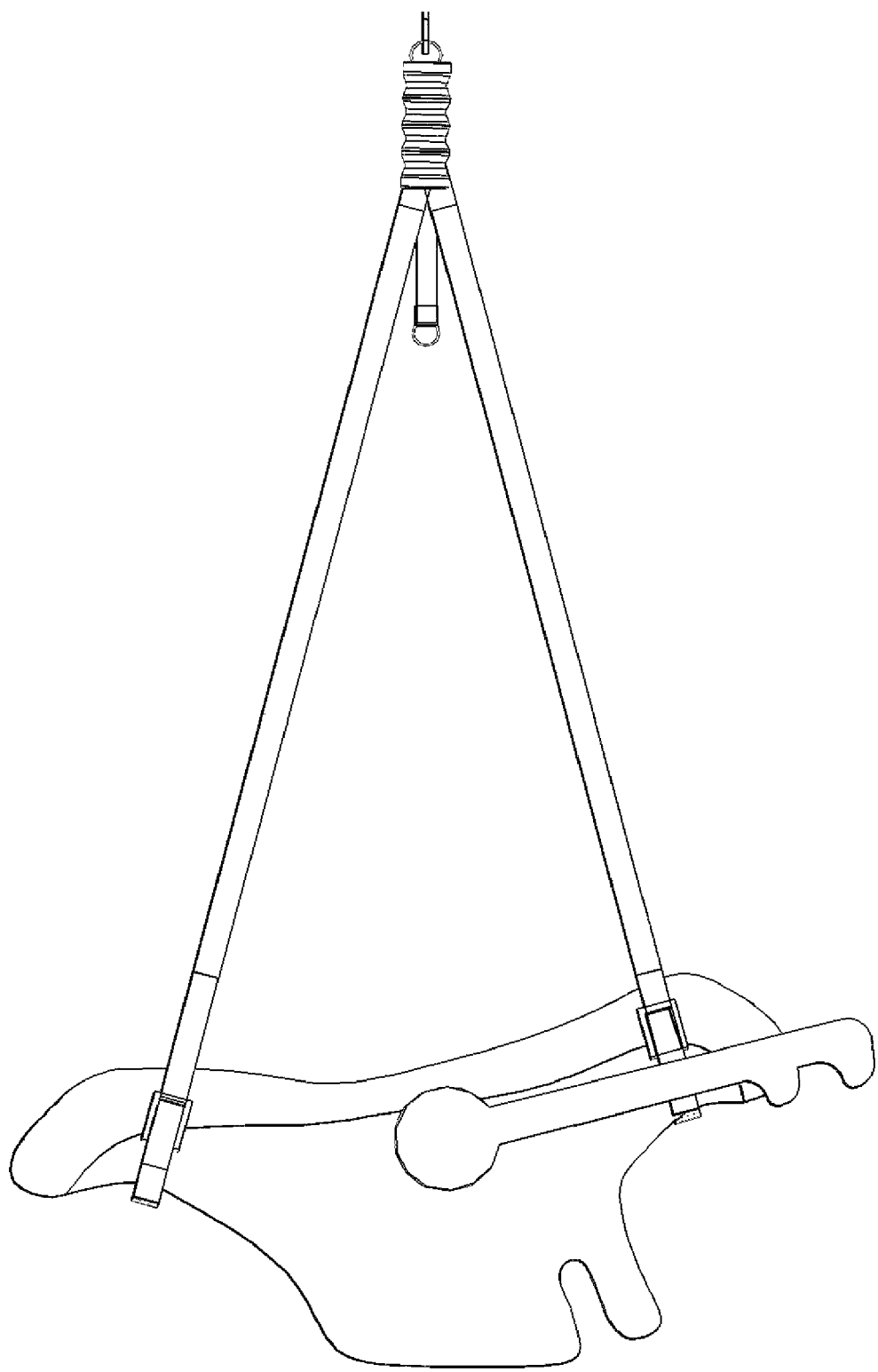
FIG. 27 shows a left side view of a lower strap harness extending around the baby seat with the head-end lower strap comprising a clip which is disposed in a left-side contour of the baby seat, and an accessory strap connected to the lower strap suspension point.

Finally, FIGS. 21-27 shows photos of one exemplary baby seat sling. FIG. 21 shows an upper suspension strap attached to a lower strap suspension point. The head-end lower strap and the foot-end lower strap extend through a channel in a handle. FIG. 22 shows an upper suspension strap attached to a structure above the baby seat. FIG. 23 show a baby seat sling having a lower strap harness, a lower strap suspension point, and an upper suspension strap suspending a baby seat. FIG. 24 shows a clip with the lower strap harness extending through an opening in the clip and a curved end of the clip disposed on the rigid portion of the baby seat. FIG. 25 shows a head-end lower strap disposed on contours of the rear surface of the baby seat, and clips disposed on the rigid portion of the baby seat. FIG. 26 shows a head-end lower strap and a foot-end lower strap disposed on the contours of the rear surface of baby seat. Two clips are attached to the intermediate portion of the head end lower strap, and the clips are disposed within contours of the rear surface of the head end of the baby seat. FIG. 27 shows a left side view of a lower strap harness extending around the baby seat. The head-end lower strap comprises a clip which is disposed in a left-side contour of the baby seat. An accessory strap is connected to the lower strap suspension point and extends generally towards the front surface of the baby seat.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A baby seat sling comprising a baby car seat, wherein the baby car seat is adapted to be suspended from a structure and has a rigid portion, a head end, a foot end, a left side, a right side, wherein the rigid portion comprises a rigid shell having a contoured front surface for supporting a child and a contoured rear surface opposite the seating surface, wherein the rigid portion comprises rigid extensions extending from the rigid shell; a sling comprising:
   a lower strap harness that extends around the rear surface of the baby car seat, the lower strap harness comprising,
   a head-end lower strap comprising a first strap end, a second strap end, and an intermediate portion, wherein the intermediate portion is disposed on the contours of the rear surface of the head end of the baby car seat;
   a foot-end lower strap comprising a first strap end, a second strap end, and an intermediate portion, wherein the intermediate portion is disposed on the contours of the rear surface of the foot end of the baby car seat;
   a lower strap suspension point extending above the seating surface of the baby car seat, the lower strap suspension point comprising a junction of the first end and the second end of the head-end lower strap and the first end and the second end of the foot-end lower strap; and
   an upper suspension strap attached to the lower strap suspension point and to the structure located above the baby car seat, wherein the upper suspension strap comprises an upper strap first end, an upper strap second end, and an upper strap intermediate portion.

2. The baby seat sling of claim 1 further comprising a transverse strap connected to intermediate portion of the head-end lower strap and the intermediate portion of the foot-end lower strap.

3. The baby seat sling of claim 2 wherein the transverse strap extends over the rear surface and from the head end to the foot end of the baby car seat, and further comprising a buckle connected to one end of the transverse strap and one of: the intermediate portion of the head-end lower strap, or the intermediate portion of the foot-end lower strap.

4. The baby seat sling of claim 1 further comprising a length adjustment buckle attached to the upper suspension strap, wherein the upper suspension strap is threaded through the length adjustment buckle.

5. The baby seat sling of claim 1 wherein the upper strap first end and the upper strap second end are connected to the lower strap suspension point to form an upper strap loop.

6. The baby seat sling of claim 5 further comprising a length adjustment buckle connected to the upper strap for adjusting the size of the upper strap loop.

7. The baby seat sling of claim 1 further comprising:
   a length adjustment buckle connected to the upper strap;
   wherein the upper strap first end is connected to the lower strap suspension point; and
   wherein the upper strap second end extends through length adjustment buckle thereby forming an upper strap loop that is adjustable in size.

8. The baby seat sling of claim 1 wherein the upper strap first end is connected to the lower strap suspension point and the upper strap second end is connected to the structure located above the baby car seat.

9. The baby seat sling of claim 1 further comprising at least one of a ring, hook, clasp, buckle, eyelet, and retractable reel attached to at least one of the following: the upper strap first end, the upper strap second end.

10. The baby seat sling of claim 1 wherein the lower strap suspension point further comprises at least one of the following attached to the junction: a ring, a hook, a clasp, a buckle, en eyelet, a retractable reel.

11. The baby seat sling of claim 1 further comprising a handle comprising a channel, wherein the head-end lower strap and the foot-end lower strap extend above the seating surface of the baby car seat, through the channel, and to the junction.

12. The baby seat sling of claim 1 wherein the first end and the second end of the head-end lower strap are connected, and wherein the first end and the second end of the foot-end lower strap are connected.

13. The baby seat sling of claim 1 further comprising at least one clip, the at least one clip comprising a curved end and an elongated generally flat portion having at least one opening, wherein the lower strap harness extends through the at least one opening and the curved end is disposed on the rigid portion of the baby car seat.

14. The baby seat sling of claim 13 further comprising:
   two generally opposed clips attached to the intermediate portion of the head-end lower strap through the at least one opening of the clip, wherein one of the opposed clips is disposed within a contour of the rear surface of the head end and left side of the baby car seat, and the other opposed clip is disposed within a contour of the rear surface of the head end and right side of the baby car seat; and
   two generally opposed clips attached to the intermediate portion of the foot-end lower strap through the at least one opening of the clip, wherein one of the opposed clips is disposed within a contour of the rear surface of the foot end and left side of the baby seat, and the other opposed clip is disposed within a contour of the rear surface of the foot end and right side of the baby car seat.

15. The baby seat sling of claim 1 further comprising padding attached to at least one of: the lower strap harness, the upper suspension strap.

16. The baby seat sling of claim 1 further comprising an accessory attachment strap connected to the lower strap suspension point, wherein the accessory attachment strap extends generally towards the front surface of the baby car seat.

17. A baby seat sling comprising a baby car seat, wherein the baby car seat is adapted to be suspended from a structure and has a rigid portion, wherein the rigid portion comprises a rigid shell having a contoured front surface for supporting a child and a contoured rear surface opposite the seating surface, wherein the rigid portion comprises rigid extensions extending from the rigid shell, the baby car seat sling comprising:

lower strap harness means for slinging the baby car seat with at least one strap which extends from an area above the front surface of the baby car seat, over or through the contours of the rigid portion of the baby car seat, and back to the area above the front surface;

lower strap suspension point means for connecting opposing sections of the at least one strap together at the area above the front surface of the baby car seat; and upper suspension strap means for suspending the lower strap harness means at the lower strap suspension point means from a structure located above the front surface of the baby car seat.

18. The invention of claim 17 further comprising height adjustment means for adjusting the suspension height of the baby car seat.

19. The invention of claim 17 further comprising handle means for joining the opposing sections of the at least one strap above the front surface of the baby car seat and for providing a carrying handle.

20. The invention of claim 18 further comprising clip means for securing the at least one strap to the rigid portion of the baby car seat.

21. The invention of claim 18 further comprising accessory attachment means for attaching accessories to the lower strap suspension point means.

22. The invention of claim 18 further comprising means for adjusting an angle of the suspended the baby car seat.

* * * * *